(12) United States Patent
Moritz et al.

(10) Patent No.: US 11,373,639 B2
(45) Date of Patent: Jun. 28, 2022

(54) SYSTEM AND METHOD FOR STREAMING END-TO-END SPEECH RECOGNITION WITH ASYNCHRONOUS DECODERS PRUNING PREFIXES USING A JOINT LABEL AND FRAME INFORMATION IN TRANSCRIBING TECHNIQUE

(71) Applicant: Mitsubishi Electric Research Laboratories, Inc., Cambridge, MA (US)

(72) Inventors: Niko Moritz, Allston, MA (US); Takaaki Hori, Lexington, MA (US); Jonathan Le Roux, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 329 days.

(21) Appl. No.: 16/712,423

(22) Filed: Dec. 12, 2019

(65) Prior Publication Data

US 2021/0183373 A1 Jun. 17, 2021

(51) Int. Cl.
*G10L 15/16* (2006.01)
*G06N 3/04* (2006.01)
*G06N 3/08* (2006.01)
*G10L 15/22* (2006.01)

(52) U.S. Cl.
CPC ............ *G10L 15/16* (2013.01); *G06N 3/0454* (2013.01); *G06N 3/082* (2013.01); *G10L 15/22* (2013.01); *G10L 2015/223* (2013.01)

(58) Field of Classification Search
CPC ....... G10L 15/063; G10L 15/26; G10L 15/34; G10L 15/16; G06N 3/0454; G06N 3/08; G06N 3/049
See application file for complete search history.

(56) References Cited

U.S. PATENT DOCUMENTS

| | | | | |
|---|---|---|---|---|
| 10,229,672 | B1* | 3/2019 | Rao | G10L 15/16 |
| 10,593,321 | B2* | 3/2020 | Watanabe | G10L 15/16 |
| 10,672,388 | B2* | 6/2020 | Hori | G10L 15/187 |
| 10,811,000 | B2* | 10/2020 | Le Roux | G10L 15/22 |
| 2017/0004824 | A1* | 1/2017 | Yoo | G10L 15/00 |
| 2017/0103752 | A1* | 4/2017 | Senior | G06N 3/0445 |
| 2018/0247639 | A1* | 8/2018 | Liu | G10L 15/04 |
| 2018/0330718 | A1* | 11/2018 | Hori | G06N 7/005 |
| 2019/0013015 | A1* | 1/2019 | Menendez-Pidal | G10L 15/02 |
| 2021/0005184 | A1* | 1/2021 | Rao | G10L 15/187 |
| 2021/0312294 | A1* | 10/2021 | Kurata | G06K 9/6267 |
| 2021/0319796 | A1* | 10/2021 | Wang | G10L 15/26 |

* cited by examiner

*Primary Examiner* — Michael N Opsasnick
(74) *Attorney, Agent, or Firm* — Gennadiy Vinokur; Hironori Tsukamoto

(57) ABSTRACT

A speech recognition system successively processes each encoder state of encoded acoustic features with a frame-synchronous decoder (FSD) and label-synchronous decoder (LSD) modules. Upon identifying an encoder state carrying information about new transcription output, the system expands a current list of FSD prefixes with FSD module, evaluates the FSD prefixes with LSD module, and prunes the FSD prefixes according to joint FSD and LSD scores. FSD and LSD modules are synchronized by having LSD module to process the portion of the encoder states including new transcription output identified by the FSD module and to produce LSD scores for the FSD prefixes determined by the FSD module.

20 Claims, 16 Drawing Sheets

SYSTEM AND METHOD FOR STREAMING END-TO-END SPEECH RECOGNITION WITH ASYNCHRONOUS DECODERS PRUNING PREFIXES USING A JOINT LABEL AND FRAME INFORMATION IN TRANSCRIBING TECHNIQUE

TECHNICAL FIELD

This invention generally relates to a system for speech recognition, and more specifically to a method and a system for streaming end-to-end speech recognition with joint frame-synchronous decoding (FSD) and label-synchronous decoding (LSD) for automatic speech recognition application with low latency requirements.

BACKGROUND

Automatic speech recognition (ASR) systems are widely deployed for various interface applications such as voice-based search. Recently, end-to-end and sequence-to-sequence neural network models have gained increased interest and popularity in the ASR community. The output of an end-to-end ASR system is usually a grapheme sequence that can either be single letters or larger units such as word-pieces, entire words, or sentence-pieces. The appeal of end-to-end ASR is that it enables a simplified system architecture compared to traditional ASR systems since it is mainly composed of neural network components and avoids the need for linguistic expert knowledge to build ASR systems. Such end-to-end ASR systems can learn all the components of a speech recognizer including the pronunciation, acoustic, and language models directly, which avoids the need for language specific linguistic information and tokenization.

Sequence-to-sequences models used for end-to-end ASR systems are majorly based on two types of neural network output paradigms, namely neural networks with frame-wise decisions, which are suitable for frame-synchronous decoding (FSD), and neural networks with label-wise decisions, which use label-synchronous decoding (LSD) instead. End-to-end ASR systems with FSD are better suitable for streaming/online ASR applications, where an ASR output can be generated soon after each spoken word with only low delays. LSD based ASR systems, however, which often show superior results in speech recognition, are less well suited for online/streaming ASR applications, since usually an entire speech utterance is required as an input due to missing alignment information prior to decoding, i.e., the lack of information regarding whether an input sequence contains sufficient information to generate a next output token or not.

Hence, the FSD and LSD are asynchronous decoders. Potentially, in applications where streaming end-to-end speech recognition is not a requirement, the combination of FSD and LSD neural networks can achieve lower word error rates compared to each single neural network model. However, these ASR systems require synchronization between the FSD and the LSD neural networks in order to enable the ASR system to be implemented for "real-time" speech recognition.

Accordingly, there is a need for effectively synchronizing the FSD neural network and the LSD neural network in order to implement the combined FSD-LSD based ASR for "real-time"/online/streaming applications.

SUMMARY

Automatic speech recognition (ASR) systems face a sequence-to-sequence modelling problem, in which an input sequence of audio samples or a sequence of acoustic features extracted from audio frames is to be mapped to an output sequence of characters. Some methods used for such sequence-to-sequence mapping are limited to offline ASR applications, where the entire speech utterance is available to the recognition process. Such methods cannot be applied in an online/streaming ASR system with low latency constraints. It is an object of some embodiments to implement an ASR system for "real-time" applications by synchronizing a frame-synchronous decoder (FSD) module and a label-synchronous decoder (LSD) module. A streaming application may be any application that requires transcription of a speech signal in "real time", for example the transcription of speech utterances in an ongoing call, ongoing lecture, ongoing conversation, or the detection and recognition of voice commands. Further, it is an object of some embodiments to improve performance of the LSD module by reducing output delays introduced by the LSD module and increasing accuracy of transcription of utterance generated by the FSD module as well as the LSD module.

Some embodiments are based on recognition that the LSD-based ASR systems need to observe a full input sequence, which is typically an entire speech utterance segmented by speech pauses, to assign a weight to each element of the input sequence in order to recognize each output label of an output sequence. For example, output labels may include single alphabetic characters or sequences of characters such as word or sentence pieces. Due to the absence of a priori knowledge about which parts of the input sequence are relevant to recognize the next output label and the need to assign a weight to each element of the input sequence, the LSD-based module usually needs to process large input sequences. Such a processing allows taking advantage of placing attention to different parts of the utterance but also increases output delays, and thus is not practical for speech recognition in a streaming/online manner.

As used herein, the output delay of LSD-based ASR is the difference between time of receiving acoustic feature frames extracted from the speech utterance and time of recognizing one or more output labels in the received acoustic frames. For example, when the LSD-based ASR system operates on the entire speech utterance, the recognition of the one or more labels in the utterance is delayed until the last word of the utterance is received. Such a delay of recognition causes the increased output delays.

Some embodiments are based on realization that the prior knowledge about relevancy of different parts of the input sequence for recognition of the next output label is an indication of positions of the acoustic frames corresponding to labels to be recognized from the input sequence. Indeed, if the positions of the acoustic frames that comprise relevant label information are known, the LSD-based model can be guided to only attend to these locations instead of all possible locations by restricting the input sequence. In such a manner, for each output label, the LSD-based model can concentrate its attention around the position of that label in the input sequence. This guided attention reduces the need to process large input sequences, which in turn reduces output delays making the LSD-based model practical for recognition of the speech utterance in a streaming/online fashion.

Some embodiments are based on realization that the frame-synchronous decoder (FSD) module can be used to provide to the LSD module the indication of positions of the acoustic frames corresponding to characters in the input sequence. This allows the LSD module to restrict attention on the relevant parts of the input sequence in order to recognize an output label. The FSD-based module generates an output for each frame of the input sequence, i.e., the input sequence and output sequence are of same lengths. The performance of the LSD-based ASR system may be superior to the FSD-based ASR system. However, some embodiments are based on realization that the input sequence and output sequence alignment used by intermediate operations of the FSD-based ASR system can be used by the LSD-based ASR system to address one or more problems mentioned above.

Some of the embodiments are based on realization that the FSD module and the LSD module can be trained jointly in a triggered attention (TA) neural network to improve speech recognition for streaming (or "real-time") applications. The TA neural network can include an encoder neural network, an FSD neural network, an LSD neural network, and a synchronization module. The encoder neural network is configured to encode acoustic information comprised in acoustic feature frames into a sequence of encoder states. The FSD module is configured to successively process each encoder state at a time and to identify encoder states that update a list of prefixes and an associated list of FSD scores maintained by the FSD module. The FSD module may preserve the list of prefixes and the associated list of FSD scores resulted from processing of previous encoder states. The list of prefixes and the list of FSD scores are updated upon decoding of subsequent encoder states. For example, the FSD module, in response to identifying an encoder state carrying information about new transcription output, expands a current list of FSD prefixes to produce a candidate list of FSD prefixes and corresponding FSD scores maintained by the FSD module.

The synchronization module is used to provide the list of prefixes generated by the FSD module to the LSD module. This enables the LSD module to process on the same list of prefixes that was generated by the FSD module. This synchronizes the FSD module and the LSD module in prefix domain. Further, the synchronization module also provides a selected portion of encoder states to the LSD module, the selected portion depends on the encoder state identified by the FSD module that expanded the current list of FSD prefixes. This enables the LSD module to place attention on the selected portion of the encoder state sequence and not on the entire encoder state sequence corresponding to the entire speech utterance. This reduces the output delay of the LSD module and synchronizes timing of the FSD module and the LSD module. In this way, the FSD module and the LSD module are synchronized in time domain and prefix domain to generate transcription of utterance for the same sequence of encoder states.

Some of the embodiments are based on realization that a joint scoring module can generate a joint list of transcription outputs decoded by the FSD module and the LSD module, and further compute an associated list of joint scores. The joint scoring module can prune the candidate list of prefixes based on the joint FSD and LSD scores. Additionally, or alternatively, the joint scoring module may output a prefix with the highest joint score as a transcription output for a current portion of the speech utterance.

Accordingly, one embodiment discloses a computer-based automatic speech recognition system, wherein the system uses a processor coupled with stored instructions implementing modules of the system, wherein the processor executing the instructions is configured to encode an incoming stream of acoustic frames representing features of a speech utterance into a sequence of encoder states of encoded acoustic feature frames; and successively process each encoder state of encoded acoustic feature frames with a frame-synchronous decoder (FSD) module until a termination condition is met, wherein the FSD module, in response to identifying an encoder state carrying information about a new transcription output, expands a current list of FSD prefixes to produce a candidate list of FSD prefixes and corresponding FSD scores, wherein each FSD prefix in the candidate list is an estimation by the FSD module of decoded transcription outputs in the encoder states processed by the FSD module, wherein a probability of an FSD prefix being the decoded transcription outputs is defined by the corresponding FSD score, wherein, in response to producing the candidate list of FSD prefixes, the processor is configured to select a portion of the encoder states including the encoder state identified by the FSD module and trigger a label-synchronous decoder (LSD) module to process the selected portion of encoder states to determine LSD scores defining probabilities of the FSD prefixes in the candidate list of FSD prefixes being the decoded transcription outputs in the selected portion of encoder states according to the LSD module; prune the candidate list of FSD prefixes according to joint scores defined by a combination of corresponding FSD scores and LSD scores; and replace the current list of FSD prefixes with the pruned list of FSD prefixes to continue decoding for a next transcription output.

Another embodiment discloses a non-transitory computer readable storage medium embodied thereon a program including modules executable by a processor for performing automatic speech recognition, the modules includes an encoder configured to encode an incoming stream of acoustic frames representing features of a speech utterance into a sequence of encoder states of encoded acoustic feature frames; a frame-synchronous decoder (FSD) module configured to successively process each encoder state of encoded acoustic feature frames to expand, in response to identifying an encoder state carrying information about a new transcription output, a current list of FSD prefixes to produce a candidate list of FSD prefixes and corresponding FSD scores, each FSD prefix in the candidate list is an estimation by the FSD module of decoded transcription outputs in the encoder states processed by the FSD module, wherein a probability of an FSD prefix being the decoded transcription outputs is defined by the corresponding FSD score; a synchronization module configured to select a portion of the encoder states including the encoder state identified by the FSD module; a label-synchronous decoder (LSD) module configured to process the selected portion of encoder states to join the FSD scores of the FSD prefixes with corresponding LSD scores defining a probability of the FSD prefix being the decoded transcription output according to the LSD module; a joint scoring module configured to prune the FSD prefixes according to the joint FSD and LSD scores and replace the current list of FSD prefixes with the pruned list of FSD prefixes to continue decoding for a next transcription output; and an output interface configured to output the FSD prefix with the highest joint score as the decoded transcription outputs of the incoming stream of acoustic frames for the encoder states processed by the FSD module.

Yet another embodiment discloses a method for automatic speech recognition, wherein the method uses a processor coupled with stored instructions implementing the method, wherein the instructions, when executed by the processor carry out steps of the method, including encoding an incoming stream of acoustic frames representing features of a speech utterance into a sequence of encoder states of encoded acoustic feature frames; successively processing each encoder state of encoded acoustic feature frames with a frame-synchronous decoder (FSD) module until a termination condition is met, wherein the FSD module, in response to identifying an encoder state carrying information about a new transcription output, expands a current list of FSD prefixes to produce a candidate list of FSD prefixes and corresponding FSD scores, wherein each FSD prefix in the candidate list is an estimation by the FSD module of decoded transcription outputs in the encoder states processed by the FSD module, wherein a probability of an FSD prefix being the decoded transcription outputs is defined by the corresponding FSD score; selecting a portion of the encoder states including the encoder state identified by the FSD module; triggering a label-synchronous decoder (LSD) module to process the selected portion of encoder states to determine LSD scores defining probabilities of the FSD prefixes in the candidate list of FSD prefixes being the decoded transcription outputs in the selected portion of encoder states according to the LSD module; pruning the candidate list of FSD prefixes according to joint scores defined by a combination of corresponding FSD scores and LSD scores; and replacing the current list of FSD prefixes with the pruned list of FSD prefixes to continue decoding for a next transcription output.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
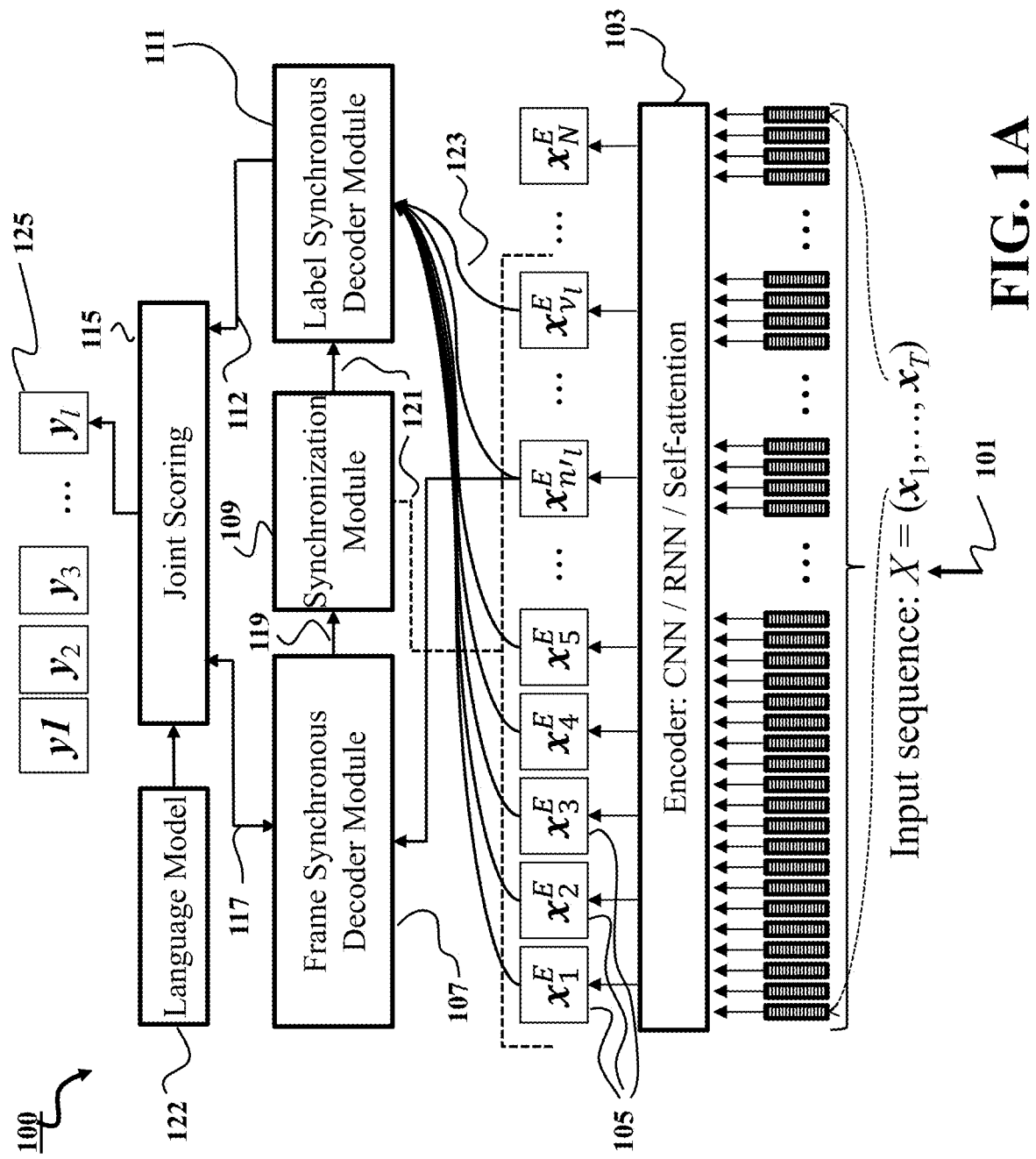
FIG. 1A illustrates a schematic of an automatic speech recognition (ASR) system configured for end-to-end speech recognition, according to some embodiments.

FIG. 1A illustrates a schematic of an automatic speech recognition (ASR) system configured for end-to-end speech recognition according to some embodiments. The speech recognition system 100 obtains incoming stream of acoustic frames representing features of a speech utterance and processes the stream of acoustic frames to generate transcription output sequences. Each transcription output sequence is a transcription of the utterance or a portion of utterance represented by the corresponding input acoustic signal. For example, the ASR system 100 can obtain incoming stream of acoustic frames 101 and generate corresponding transcription outputs 125 that are a transcription of the utterance represented by the incoming stream of acoustic frames 101.

The incoming stream of acoustic feature frames 101 may include a sequence of audio samples that is a digital representation of an utterance, e.g., a continuous stream of data. Each feature frame extracted from audio data may correspond to a sequence of time steps, e.g., where each frame of audio data is associated with 25 milliseconds of audio samples shifted 10 milliseconds further in time from the previous frame of audio data. Each frame of audio data in the sequence of feature frames of audio data may include acoustic information that characterizes the portion of the utterance at the corresponding time step. For example, the sequence of feature frames of audio data may include filter bank spectral energy vectors.

The transcription or label outputs 125 may include a sequence of transcription pieces of the utterance represented by the incoming stream of acoustic frames 101. The transcription outputs 125 may include one or more characters. For example, the transcription outputs 125 may be a character or a sequence of characters from a Unicode character set. For example, the character set may include the alphabet of English, Asian, Cyrillic as well as Arabic languages. The character set may also include Arabic numerals, a space character, and punctuation marks. Additionally, or alternatively, transcription outputs can include byte encodings, words, and other linguistic constructions.

The ASR system 100 includes an encoder 103, a frame-synchronous decoder (FSD) module 107, a synchronization module 109, a label-synchronous decoder (LSD) module 111, a joint scoring module 115, and an external language model 122. The present disclosure provides a system for combined implementation of the FSD module 107 and the LSD module 111 to build the ASR system 100 that is suitable for "real-time" speech recognition. End-to-end ASR systems with FSD can easily be applied for streaming/online ASR applications, where an ASR output must be generated soon after each spoken word with only little output delays. LSD based ASR systems, however, which often show superior results in speech recognition, are less well suited for online/streaming ASR, since an entire speech utterance is usually required as an input due to missing alignment information prior to decoding, i.e., the lack of information regarding whether an input sequence contains sufficient information to generate a next output token. Nevertheless, the FSD module 107 and the LSD module 111 can be implemented together in one system 100 to achieve fast and efficient ASR that may be used for streaming ASR applications.

To that end, a joint scoring module 115 provides joint scoring of the transcription outputs decoded by the FSD module 107 and the transcription outputs decoded by the LSD module 111. However, the FSD module 107 and the LSD module 111 work on two different principles of operations. In order to implement the FSD module 107 and the LSD module 111 together, they need to be synchronized. The synchronization enables the joint scoring module 115 to provide the joint scoring for list of corresponding prefixes decoded by the FSD module 107 and the LSD module 111. If these modules 107, 111 are not synchronized, then a list of prefixes generated by the FSD module 107 can be different from a list of prefixes generated by the LSD module 111. Further, the time of generation of the lists of prefixes by the modules 107, 111 can also be different, as the FSD module 107 operates on frame-by-frame or encoder state-by-state basis, while the LSD module 111 operates on a label-by-label basis and consumes a sequence of input frames or encoder states. Therefore, without synchronization of the modules 107, 111 in the time domain and the prefix domain, the joint scoring module 115 cannot combine both transcription hypotheses and generate intermediate outputs with a low latency.

For example, the ASR system 100 may receive an incoming stream of acoustic feature frames corresponding to the speech signal of the word 'dog'. Further, if at time instance n the FSD module 107 generates a list of prefixes that comprise: 'dog' with FSD score 0.3, 'dah' with FSD score 0.2, and 'dag' with FSD score 0.1, and at another time instance say n+4 the LSD module 111 generates a list of prefixes that comprise: 'dug' with LSD score 0.3, 'dah' with LSD score 0.2, and 'dag' with LSD score 0.5, then in the absence of synchronization of the modules in time domain and prefix domain, the joint scoring module 115 cannot perform joint scoring as the list of prefixes is different and it cannot generate a joint output with low delay after each uttered word as it has to wait for the LSD module.

The LSD module 111 is synchronized in time domain with the FSD module 107 to reduce the output delay of the LSD module. The output delay is caused in an LSD based ASR system because typically the LSD based ASR system may need to observe an entire speech utterance segmented by speech pauses, to assign a weight to each input frame in order to recognize each transcription output 125. Due to the absence of a priori knowledge about which part of an input acoustic signal is relevant to recognize the next transcription output and the need to assign a weight to each encoder state, the LSD module 111 usually needs to process large input sequences. Such a processing allows taking advantage of placing attention to different parts of the utterance but also increases output delays, and thus is not practical for speech recognition in a streaming/online fashion.

As used herein, an output delay of an ASR system is the time difference between receiving frames of a speech signal and recognizing the received acoustic information. For example, when the LSD based ASR system operates on the entire speech utterance, the recognition of the words in the utterance is delayed until the last word of the utterance is received. Such a delay of recognition causes the increased output delays.

The prior knowledge about relevancy of different parts of an input sequence to recognition of the next transcription output is an indication of locations of frames corresponding to the transcription outputs to be recognized in the input sequence. Indeed, if the locations of frames that encode relevant information for transcription outputs are known, the attention mechanism of the LSD module 111 can be restricted to these locations plus a configurable number of past and future encoder frames or states. In such a manner, for each transcription output, the LSD module 111 can focus its attention around such locations in the input sequence. This guided attention reduces the need to process large input sequences, which in turn reduces the output delays making the LSD module 111 practical for speech recognition in a streaming/online fashion.

To that end, the ASR 100 uses the FSD module 107, which acts as both an alignment decoder and transcription outputs decoder. The FSD module 107 is trained to determine locations 119 of encoder states in the sequence 105 that encode transcription outputs 125, such as characters, byte encodings, words, etc. In some embodiments, the FSD module 107 may be implemented using a connectionist temporal classification (CTC) neural network objective. Further, in some embodiments, the LSD module 111 may be implemented using an attention-based decoder. The CTC is a type of objective function and associated neural network output for training neural networks such as long short-term memory (LSTM) neural networks to tackle sequence problems where the timing is variable. An FSD based ASR system is an alternative to an LSD based ASR system. The FSD generates an output for each frame of the input sequence, i.e., inputs and outputs are synchronized, and a beam search algorithm is used to find the best output sequence before collapsing neural network outputs to a prefix and an output transcription. The performance of the LSD based ASR systems may be superior to FSD based ASR systems. However, some embodiments are based on realization that the input and output frame alignment used by intermediate operations of the FSD based ASR system can be used by the LSD based ASR system to address its output delay drawbacks mentioned above.

To take advantage from the alignment information 119 provided by the FSD module 107, the ASR system 100 includes the synchronization module 109 configured to partition the sequence of encoder states 105 into a set of partitions 121. For example, the synchronization module 109 can partition the sequence of encoder states for each location 119 of the identified encoder states, such that the number of partitions 121 is defined by (e.g., equal to) the number of the identified encoder states 119 that encode a transcription output 125.

The synchronization module further submits a list of current prefixes generated by the FSD module 107 and the selected portion of the sequence of encoder states to the LSD module 111. This ensures that the LSD module 111 processes on the same list of prefixes as that of the FSD module 107 in order to estimate the transcription output likelihood of the LSD module. Thus, synchronization of the FSD module 107 and the LSD module 111 in prefix domain is achieved. Further, to ensure that the LSD module 111 outputs a list of LSD scores for the list of prefixes at approximately the same time when the FSD module 107 outputs a list of FSD scores, only the selected portion of the sequence of encoder states is provided to the LSD module 111 by the synchronization module 109. This enables the LSD module 111 to place attention on the selected portion of the encoder state sequence 105 and not on the entire sequence 105, which reduces output delay of the LSD module 111. Thus, synchronization of the FSD module 107 and the LSD module 111 in time domain is achieved.

The ASR system 100 includes the encoder 103 that processes the incoming stream of acoustic feature frames 101 and generates a sequence of encoder states 105 providing alternative, e.g., higher, representations for the input acoustic signal 101. The sequence of encoder states 105 may include an alternative sequence of feature frames of audio data that correspond to a second set of time steps. In some implementations, the alternative representation for the input acoustic sequence is subsampled to a lower frame rate, i.e., the second set of time steps in the alternative representation is smaller than the first set of time steps in the input acoustic sequence 101.

Further, the FSD module 107 is configured, e.g., trained, to process encoder states 105 successively and to update a list of prefixes and an associated list of FSD scores maintained by the FSD module 107. The FSD module 107 is configured to successively process each encoder state of encoded features to identify an encoder state that updates a list of FSD prefixes maintained by the FSD module. In such a manner, the FSD module expands a current list of FSD prefixes in response to identifying an encoder state carrying information about a new transcription output to produce a candidate list of FSD prefixes. Each FSD prefix is a candidate estimation by the FSD module of decoded transcription outputs with probability defined by its corresponding FSD score, i.e., the FSD score defines a probability of an FSD prefix being the decoded transcription outputs. The list of FSD prefixes and the list of FSD scores are updated upon decoding of subsequent encoder states. For example, a current list of FSD prefixes determined during a previous iteration is expanded to a candidate list of prefixes for a current iteration. The FSD module 107 provides 117 the candidate list of FSD prefixes and the associated list of FSD scores to the joint scoring module 115. The joint scoring module 115 prunes the candidate list of FSD prefixes based on LSD and FSD scores to form the current list of FSD prefixes for the next iteration. In such a manner, the computational efficiency of FSD module is maintain without sacrificing quality of decoding.

To achieve this result, in some embodiments, the synchronization module 109 is configured to select a portion of the sequence of encoder states, where the portion includes the encoder state identified by the FSD module 107 in response to update of the list of prefixes maintained by the FSD module 107. The synchronization module 107 provides the selected portion of the sequence of encoder states and corresponding prefixes to the LSD module 111. The LSD module 111 is configured, e.g., trained, to process the selected portion of the sequence of encoder states to update a list of LSD prefixes and corresponding LSD scores maintained by the LSD module 111. Similarly, to FSD module, each LSD prefix is a candidate estimation by the LSD module of the decoded transcription outputs with probability defined by its corresponding LSD score. In some embodiments, the synchronization module 109 passes the FSD prefixes to the LSD module, and the LSD module determines LSD scores only for the FSD prefixes. In such a manner, the FSD and LSD modules are synchronized in the prefix domain.

Decoding of only the selected portion of the sequence of encoder states enables the LSD module 111 to place attention only on the selected portion of the sequence 105 and not on the entire sequence 105, which reduces output delay of the LSD module 111. In this manner synchronization of the FSD module 107 and the LSD module 111 in the time domain and the prefix domain can be achieved. Thus, the FSD module 107 and the LSD module 111 decode the same sequence of encoder states at approximately the same time.

Further, to increase the accuracy of the transcription output, the ASR system 100 includes the joint scoring module 115. The joint scoring module 115 combines the FSD scores and the LSD scores of corresponding prefixes in the updated list of prefixes maintained by the FSD module 107 and the LSD module 111 to produce a joint list of prefixes and associated list of joint scores. Each joint score in the list of joint scores is a weighted combination of the FSD score and the LSD score of corresponding prefixes in the updated list of prefixes in the FSD module 107 and the updated list of prefixes in the LSD module 111. In addition, scores provided by an external language model 122 can be weighted and added to the joint FSD and LSD scores to further improve the recognition accuracy.

Further, the joint scoring module 115 feeds back 117 the pruned joint list of prefixes to the FSD module 107, where a pruning stage removes unlikely prefixes from the list of prefixes based on the corresponding joint scores. Thus, the joint scoring module 115 prunes the candidate list of FSD prefixes according to joint scores defined by a combination of corresponding FSD scores and LSD scores. The pruning from the joint scoring module 115 synchronizes the selection of best prefixes of the FSD module 107 and the LSD module 111 for subsequent decoding of encoder states over subsequent time steps. This further increases accuracy of the FSD module 107 and the LSD module 111 to decode the transcription outputs 125 from subsequent encoder states. Further, the joint scoring module 115 can output the prefixes with highest joint scores as a current portion of transcription of the incoming stream of acoustic frames 101 for a current time step.

In some embodiments, the FSD module can use an external language model to update and pre-prune the list of generated FSD prefixes prior to communicating with the synchronization module and prior to triggering the LSD module in order to improve recognition accuracy and to reduce the computational load produced by the LSD module due to the pre-pruning.

In some implementations, the combination of the encoder 103, the FSD module 107, the synchronization module 109, and the LSD module 111, is referred to as triggered attention (TA) model or TA neural network. In effect, the TA model can process the portion of the utterance as it is received, making the ASR system 100 practical for recognition in a streaming/online fashion. Further, working of the FSD module 107, the LSD module 111, and the joint scoring module 115 with an exemplary list of prefixes is explained below in FIG. 1B in conjunction with FIG. 1A.

Figure 1B:
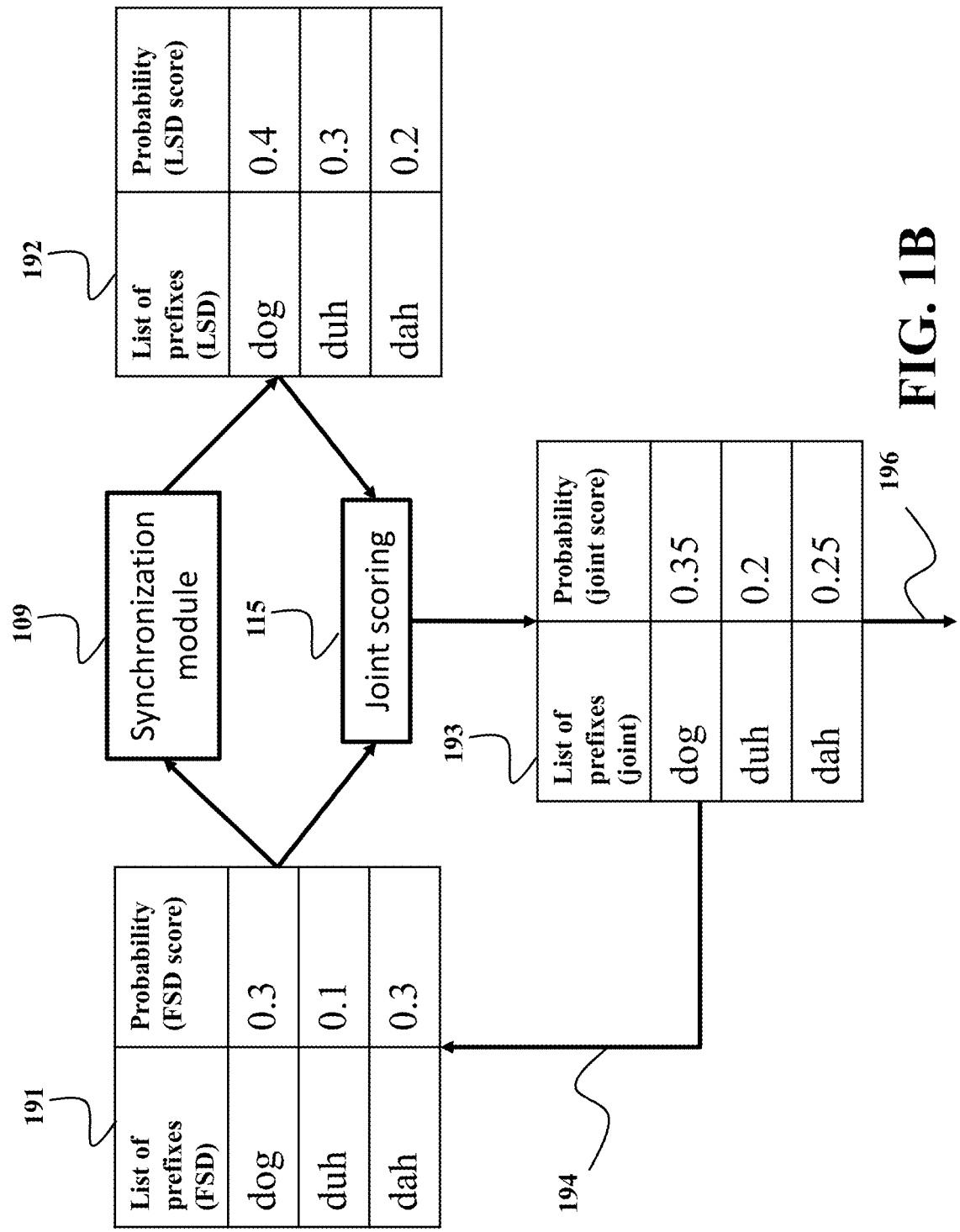
FIG. 1B illustrates an exemplary list of prefixes and associated scores generated by a frame-synchronous decoder (FSD) module, a label-synchronous decoder (LSD) module, and a joint scoring module.

FIG. 1B illustrates an exemplary list of prefixes and associated scores generated by the FSD module, the LSD module, and a joint scoring module. Table 191 illustrates the list of prefixes generated by the FSD module, table 192 illustrates the list of prefixes generated by the LSD module, and table 193 illustrates the list of prefixes generated by the joint scoring module.

The joint scoring module 115 merges matching FSD and LSD prefixes and their corresponding FSD and LSD scores 191 and 192 to produce a joint list of prefixes and a corresponding list of joint scores 193. For example, in one embodiment the joint scoring module 115 processes the attention decoder transcription output scores 112 (LSD scores) and the FSD module output scores 117 (FSD scores) to jointly score both transcription outputs and to find the best joint transcription output sequence of an utterance. For example, for each time step the joint scoring module 115 may output the transcription of best joint score, which can be computed by the weighted sum of both transcription output scores as shown in the example for a weight factor of 0.5. In addition to computing the joint FSD and LSD scores, the score of an external language model may be weighted and added as well.

Next, the joint scoring module 115 replaces 194 the list of FSD prefixes maintained by the FSD module with the pruned joint list of prefixes, which is a reduced list of the best joint prefixes. Such replacement 194 synchronizes FSD and LSD modules in prefix domain by selecting the best joint prefix hypotheses for further processing and removing unlikely prefix candidates based on the joint scores. The current list of active prefixes is received by the LSD module 111 from FSD module 107 through the synchronization module 109.

For example, input acoustic feature frames may correspond to the word "dog". The FSD module 107 receives a sequence of encoder states 105 of the encoded acoustic feature frames 101. The FSD module 107 generates a list of FSD prefixes with corresponding FSD scores as illustrated in table 191. Each prefix in the list of prefixes is a candidate estimation of the transcription output 125 corresponding to the received acoustic frames. The FSD module 107 predicts transcription output being "dog" and "dah" with highest probability i.e. FSD score 0.3 and predicts transcription output being "duh" with lowest probability 0.1. Further, the FSD module 107 provides location of the encoder states encoding the transcription output 125 and the list of FSD prefixes to the synchronization module 109.

The synchronization module 109 selects the portion of the sequence of encoder states. The selected portion includes the encoder state identified by the FSD module 107. The synchronization module 107 provides the selected portion of the sequence of encoder states and corresponding prefixes to the LSD module 111.

Further, the LSD module 111 decodes the portion of the sequence of encoder states to generate a list of LSD prefixes and an associated list of probabilities i.e. LSD score as depicted in table 192. Unlike the FSD module 107, the LSD module 111 predicts transcription output being "dog" with highest probability of 0.4 and predicts transcription output being "duh" and "dah" with lower probabilities. The probability scores generated by both the FSD module 107 and the LSD module 111 can be combined to accurately predict the transcription output "dog".

To that end, the joint scoring module 115 obtains the list of prefixes and the associated scores from both the FSD module 107 and the LSD module 111. In order to determine the most accurate output, the joint scoring module 115 may combine the FSD scores and the LSD scores of the corresponding prefixes. The combination of the scores may correspond to a weighted average. However, the combination of the scores may be implemented using any other mathematical operation/equation. Thus, as illustrated in table 193, the joint scoring module 115 generates a joint list of prefixes and associated joint probabilities, where the prefix "dog" corresponds to the highest joint probability. Therefore, the joint scoring module 115 outputs "dog" as the transcription output for the input acoustic frames at the current time step.

Figure 1C:
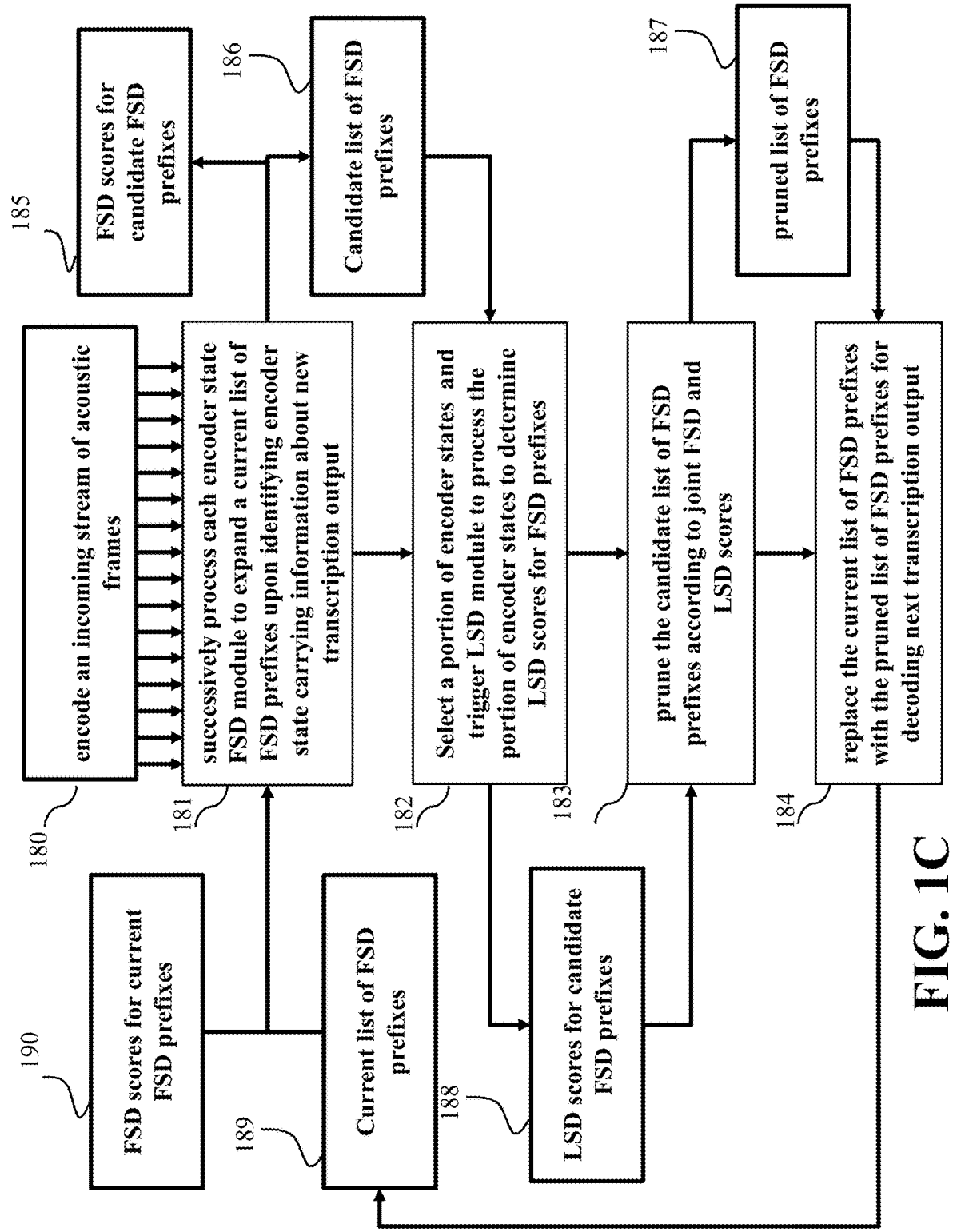
FIG. 1C shows a block diagram of an automatic speech recognition method according to some embodiments.

FIG. 1C shows a block diagram of an automatic speech recognition method according to some embodiments. The embodiments encode 180 an incoming stream of acoustic frames representing features of a speech utterance into a sequence of encoder states of encoded acoustic feature frames, and successively process 181 each encoder state of encoded acoustic feature frames with FSD module until a termination condition is met, e.g., until an end of speech utterance. The FSD module, in response to identifying an encoder state carrying information about new transcription output, expands a current list of FSD prefixes 189 to produce a candidate list of FSD prefixes 186 and corresponding FSD scores 185 of the candidate list of FSD prefixes 186.

Using FIG. 1B as an example, let the current list of FSD prefixes 189 include 'do', 'du', and 'da' prefixes. In response to identifying an encoder state carrying information about new transcription output, the FSD module expands the current list of 'do', 'du', and 'da' FSD prefixes to produce a candidate list of 'dog', 'duh', and 'dah' FSD prefixes 186. In practice, the candidate list of FSD prefixes would include many more prefixes that need to be pruned to maintain computational efficiency. For example, in some implementations, the size of the current list of FSD prefixes is fixed and is less than the size of the candidate list of FSD prefixes, such that the pruning preserves n-best FSD prefixes in the candidate list of FSD prefixes with highest joint scores, wherein n is the size of the current list of FSD prefixes. To that end, the joint scoring module needs to prune the candidate list of FSD prefixes based on FSD score. In this example, the 'duh' FSD prefix needs to be pruned as having the lowest FSD score. However, some embodiment uses the FSD and LSD scores to prune the candidate list of FSD prefixes based on the joint scores, rather than only based on the FSD scores, which improves accuracy of the pruning.

To that end, some embodiments trigger 182 a label-synchronous decoder (LSD) module to process the portion of the sequence of encoder states processed by FSD module to determine LSD scores 188 defining probabilities of the FSD prefixes in the candidate list of FSD prefixes being the decoded transcription outputs in the portion of the sequence of encoder states according to the LSD module. Such a triggering, e.g., implemented using the synchronization module, synchronizes the FSD module and the LSD module in time and prefix domains because the LSD module processes the portion of the encoder states including the new transcription output identified by the FSD module and estimates the LSD scores 188 for the FSD prefixes 186.

Having LSD and FSD scores for the FSD prefixes 186, some embodiments prune 183 the candidate list of FSD prefixes according to joint scores defined by a combination of corresponding FSD scores and LSD scores, and replace 184 the current list of FSD prefixes 189 with the pruned list of FSD prefixes 187 for decoding next transcription output.

For example, the FSD prefix 'duh' can be pruned out due to the smallest joint score of 0.2.

One embodiment replaces only FSD prefixes without replacing FSD scores in the replaced current list of FSD prefixes. For example, after the pruning of FSD prefix 'duh', the current list would have prefixes 'dog' and 'dah' with original FSD scores of 0.3 and 0.3 respectively. In such a manner, the continuity of FSD decoding is maintained.

In various embodiments, the decoding process is performed iteratively, so for different iterations different locations of transcription outputs for "d," "o," "a," "g," and/or "h" are identified. In some implementations, the FSD module, the LSD module, and the joint scoring module iteratively decode the transcription of the incoming stream of acoustic frames, such that, for each iteration, the prefixes in the list of FSD and/or LSD prefixes are updated with new transcription output tokens.

Figure 1D:
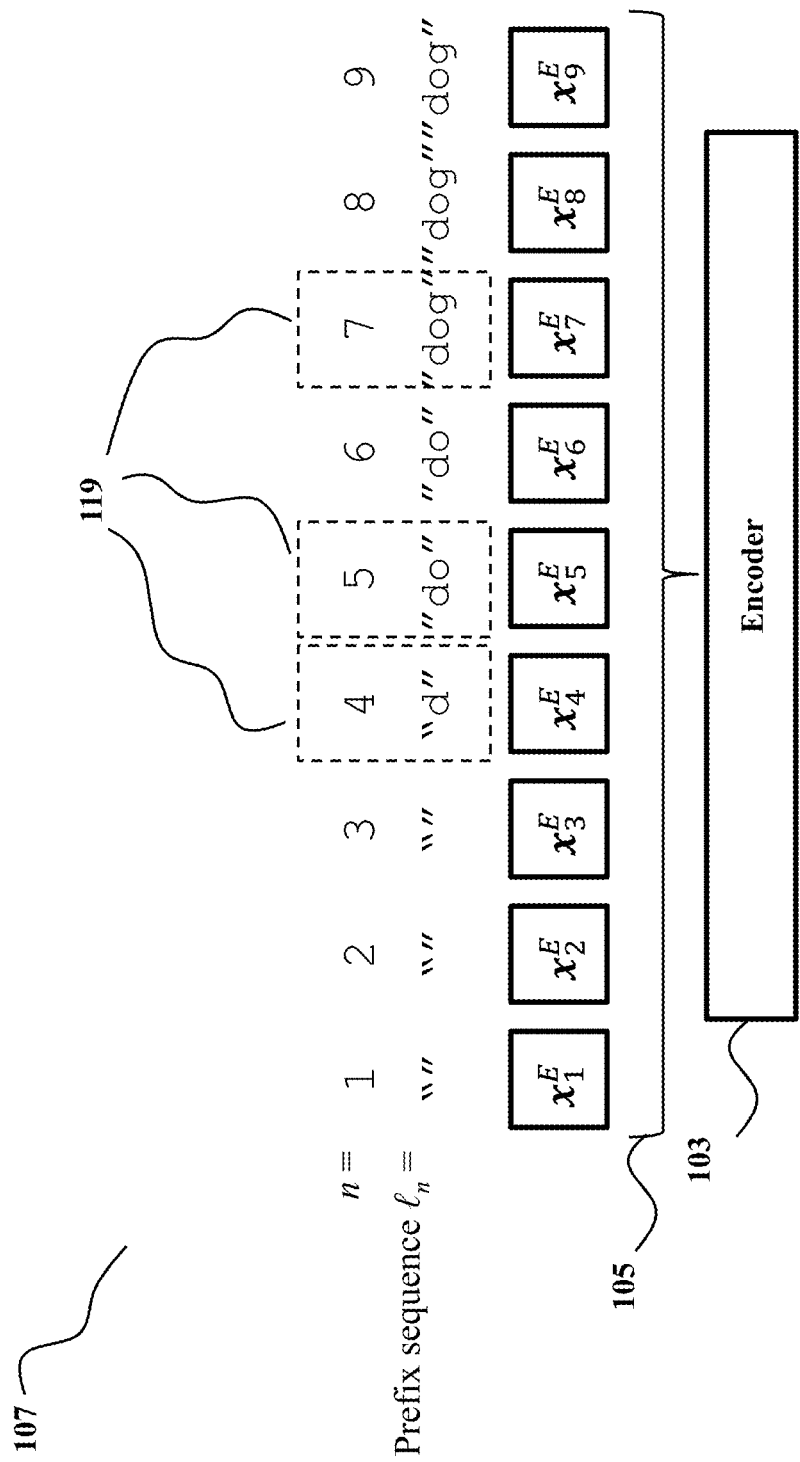
FIG. 1D illustrates an exemplary operation of the FSD module, according to some embodiments.

FIG. 1D illustrates an exemplary operation of the FSD module. One of the objectives of the FSD module 107 is to decode a sequence of encoder states 105 produced by the encoder 103. To that end, the FSD module 107 is trained to decode the sequence 105 to produce a sequence of transcription outputs 125. The FSD module 107 processes the sequence of encoder states 105 frame-by-frame and computes a sequence of prefixes or list of prefixes, which corresponds to an intermediate transcription output. Further, a list of FSD scores associated with the list of prefixes is generated by the FSD module 107. The list of FSD scores may be generated by marginalizing the probabilities of all paths of the FSD neural network that lead to the same prefix and intermediate transcription output. The time and frame location at which a prefix sequence is expanded by appending a newly recognized character provides alignment information. In some embodiments, the alignment information produced by the FSD module 107 is used to partition the encoder state sequence and to trigger the attention-based decoding process implemented using the LSD module 111. The rationale behind this approach is that the prefix scores of the LSD module 111 may be better and more reliable than the prefix scores of the FSD module 107. To that end, the intermediate alignment information produced by the FSD module 111 is used to further improve processing of the LSD module 111 by reducing output delays produced by the LSD module 111, in absence of the alignment information.

In some embodiments, a joint scoring module 115 is implemented to produce joint scoring of the transcription outputs decoded by the FSD module 107 and the transcription outputs decoded by the LSD module 111. This improves accuracy of speech recognition of the ASR system. In some embodiments, the FSD module 107 is utilized twice: firstly, to assist partitioning the sequence of encoder states for the LSD module 111 and secondly for further improving the accuracy of transcription outputs decoded by the LSD 111.

Further, the boxes surrounding elements of indexed sequence identify locations of encoder states 119 that encode the transcription outputs 125 in the sequence of encoder states 105. For example, the encoder 103 converts an input acoustic sequence X of acoustic features such as log-mel spectral energies into an encoder state sequence $X_E$ of length N: $X_E$=Encoder(X).

For example, in one implementation, the encoder output is sub-sampled to a four-times lower frame rate compared to the feature matrix X, which has a sampling rate of 100 Hz. Let $Z=(z_1, \ldots, z_N)$ denote a framewise label sequence of length N, with $z_n \in \mathcal{U} \cup \epsilon$, where $\mathcal{U}$ denotes a set of distinct transcription outputs that can be single characters wordpieces or words, for example, and $\epsilon$ the blank symbol. Let $C=(c_1, \ldots, c_L)$, with $c_l \in \mathcal{U}$, denote a label sequence of length L, such that the sequence Z reduces to C when collapsing repeated labels into single occurrences and removing blank symbols.

In some embodiments, the FSD module 107 decodes the sequence of encoder states 105 probabilistically, with the probabilities derived as:

$$p_{ctc}(C|X_E) = \sum_Z p(C|Z, X_E)p(Z|X_E) \approx \sum_Z p(C|Z)p(Z|X_E) = \Sigma_Z p(Z|C)p(Z|X_E)\frac{p(C)}{p(Z)},$$

where p(Z|C) denotes the transition model and $p(Z|X_E)$ an acoustic model.

In some embodiments, a label sequence Z*, which is the label sequence or CTC path of highest probability, is determined during training using a forced-alignment process. The alignment for conditioning the LSD module to a subsequence of the encoder state sequence is identified by the frame with highest probability within each sub-sequence of frames corresponding to the same label in Z* as an identified encoder state. For example, consider the sequence Z* is written using the indices $i_l$ and $j_l$ for the beginning and end of the occurrence of the l-th label $c_l$ in Z*, with $i_l \leq j_l < i_{l+1}$, $\forall l$, and $z_n = c_l$ for all t such that $i_l \leq n \leq j_l$ and $z_t = \epsilon$ for all other indices. The TA alignment performs a mapping from a sequence Z* to a sequence including a subset of identified encoder states encoding the transcription outputs with highest probability 125 $Z'=(\epsilon^*, c_1, \epsilon^*, c_2, \epsilon^*, \ldots, c_L, \epsilon^*)$ of same length N, in which * denotes zero or more repetitions and where each $c_l$ occurs exactly once, at the frame with maximum probability within those corresponding to $c_l$, as follows:

$$z'_n = \begin{cases} c_l & \text{if } n = \text{argmax}_{i_l \leq n' \leq j_l} p(z_{n'}|X_E), \text{ for some } l \in \{1, \ldots, L\}, \\ \langle b \rangle & \text{otherwise.} \end{cases}$$

Alternatively, the FSD module 107 may identify the first or last frame within each sub-sequence of frames corresponding to the same grapheme in Z* as an identified encoder state.

Figure 1E:
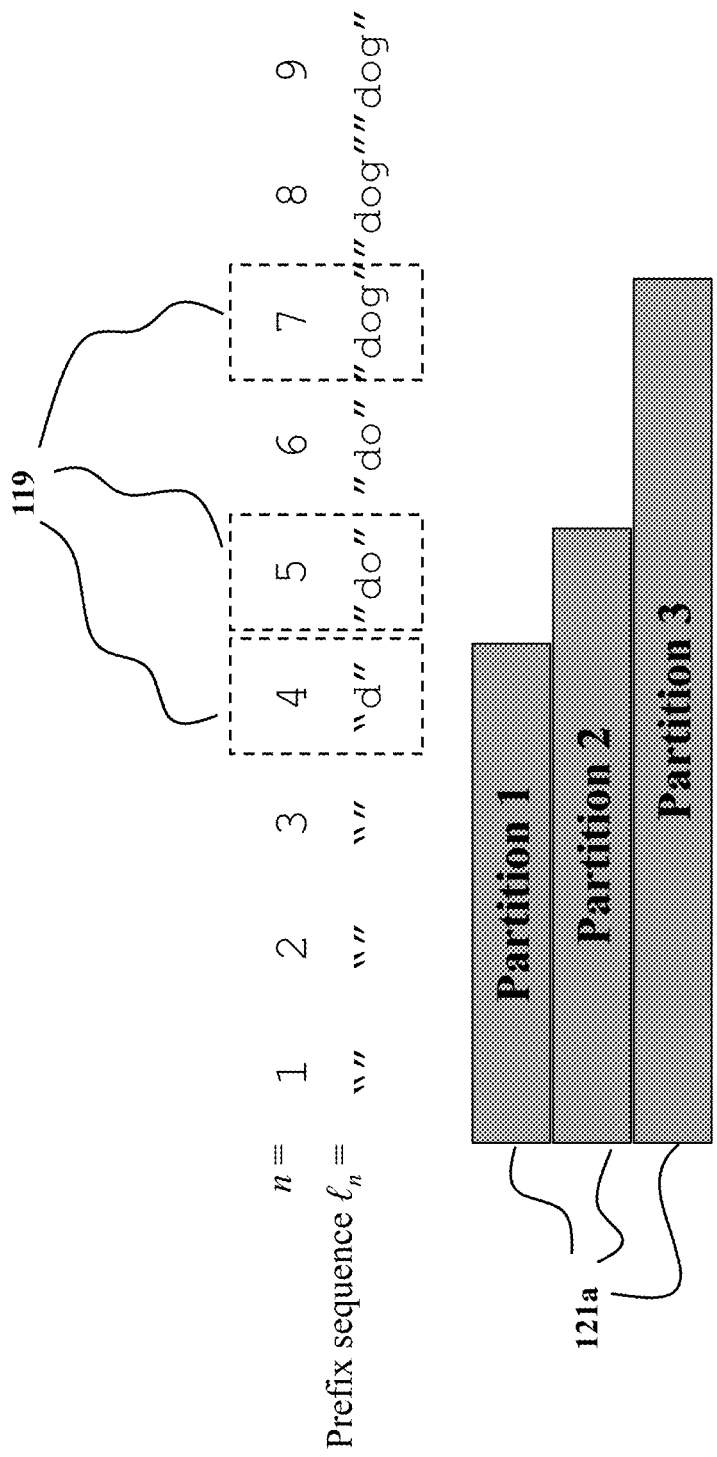
FIG. 1E and FIG. 1F illustrate partitioning examples of limiting the future context of the sequence of encoder states, according to some embodiments.
Figure 1F:
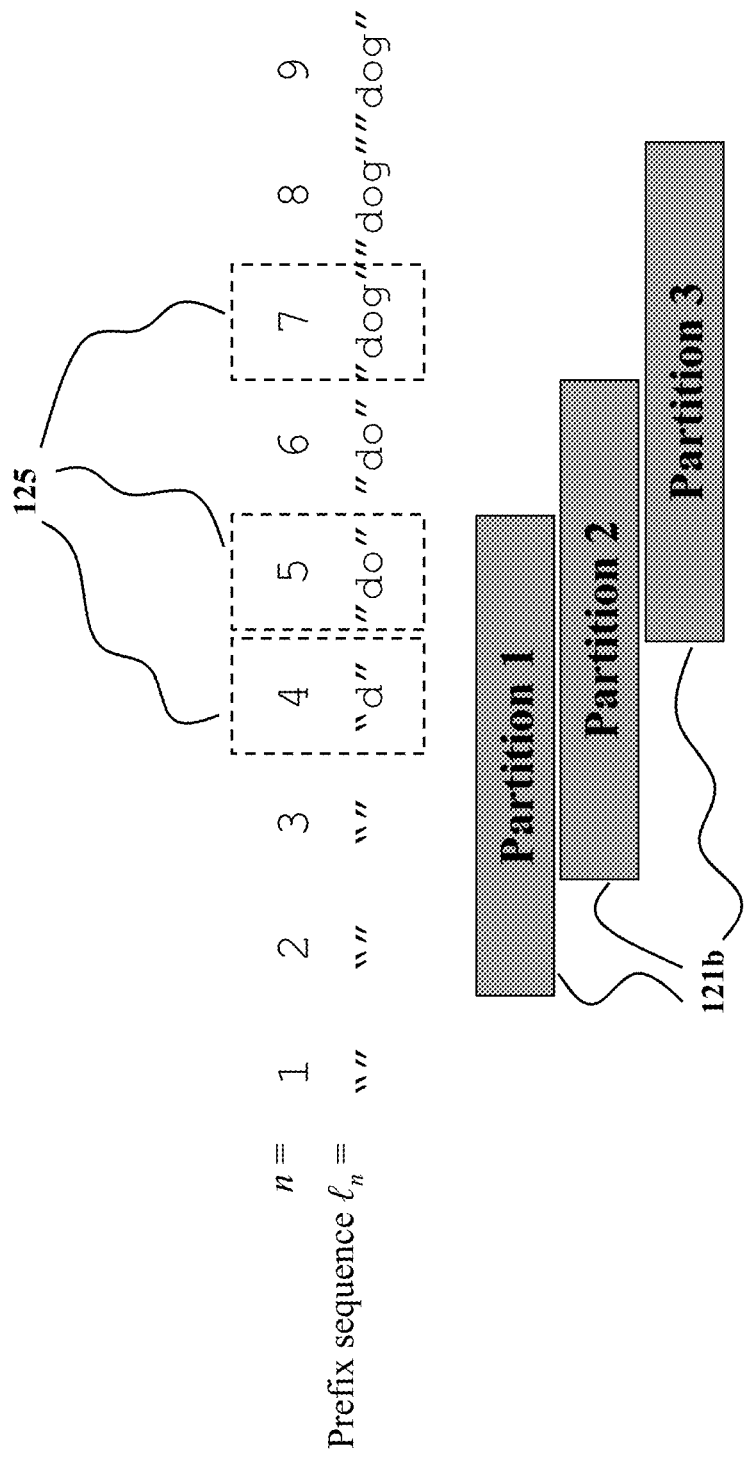

FIG. 1E and FIG. 1F illustrate examples of partitioning the sequence of encoder states according to some embodiments. In various embodiments, the partitioning is performed by the synchronization module 109 operatively connected to the FSD module 107, the LSD module 111, and the encoder 103. The synchronization module 109 is configured to access the alignment information 119 of the FSD module 107, partition the sequence of encoder states 105 produced by the encoder 103, and submit sequentially the portions 121 of the sequence of encoder states to the LSD module 111.

For example, in one embodiment of FIG. 1E, each partition 121a includes encoder states from the beginning of the sequence of encoder states 105 until a look-ahead encoder state determined by shifting the location of the identified encoder state forward with a fixed shift. Example of a look-ahead encoder state 123 is shown in FIG. 1A. For example, if a value of the fixed shift is 5, and a location of the identified state encoder is $8^{th}$ in the sequence of the encoder states 105, the partition 121a includes the first 13 encoder states. If a location of a subsequent identified encoder state is 11, the partition 121a includes the first 16 encoder states. In effect, each partition includes encoder states for new transcription outputs while increasing the length of partition allowing the LSD module 111 to exploit its length.

In alternative embodiment of FIG. 1F, a partition 121b corresponding to a location of an identified encoder state includes a predetermined number of look-ahead and look-back encoder states relative to the location of the identified encoder state. For example, if the location of the identified encoder state is $15^{th}$ in the sequence of the encoder states and if the fixed look ahead and look back values amount to 4 and 8, respectively, the partition 121b includes encoder states between $7^{th}$ and $19^{th}$ in the sequence of the encoder states 105. In effect, each partition includes encoder states for new transcription outputs while having a fixed length of partition to reduce the computational burden on the LSD module 111.

Figure 2A:
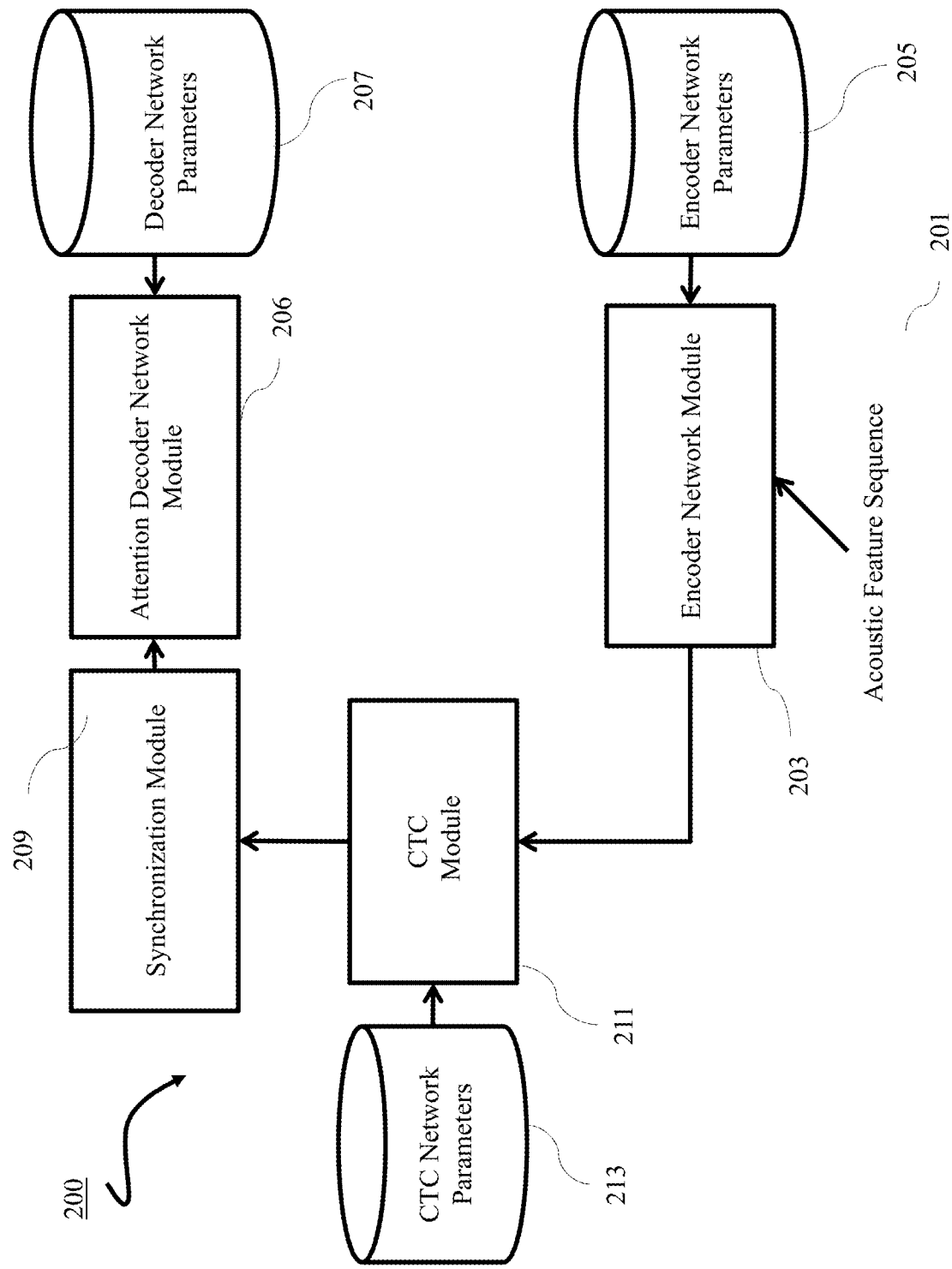
FIG. 2A illustrates a block diagram of a triggered attention neural network of an end-to-end speech recognition system according to one embodiment.

FIG. 2A illustrates a block diagram of a triggered attention neural network 200 of an end-to-end speech recognition system according to one embodiment. In this embodiment, the encoder 103, the FSD module 107, and the LSD module 111 are implemented as neural networks. Further, the FSD module 107 is implemented using connectionist temporal classification based (CTC-based) neural network or CTC module, and the LSD module 111 is implemented using an attention-based decoder neural network. The triggered attention model 200 includes an encoder network module 203, encoder network parameters 205, an attention decoder network module 206, decoder network parameters 207, a synchronization module 209, a CTC module 211, and CTC network parameters 213. The encoder network parameters 205, the decoder network parameters 207, and the CTC network parameters 213 are stored in a storage device to provide parameters to corresponding modules 203, 205, and 211. An acoustic feature sequence 201 is extracted from audio waveform data and may be stored in a storage device and provided to the encoder network module 203. The audio waveform data may be obtained via an input device using a digital signal processing module (not shown) receiving and processing speech sounds in the audio data.

The encoder network module 203 includes an encoder network that converts acoustic feature sequence 201 into an encoder feature vector sequence using the encoder network reading parameters from encoder network parameters 203. The CTC module 211 receives an embedding vector sequence from the encoder network module 203, and computes CTC-based posterior probability distributions of the label sequence using the CTC network parameters 213 and a dynamic programming technique. After the computation, the CTC module 211 provides the most probable label sequences or prefixes including frame locations to the synchronization module 209.

The attention decoder network module 206 includes a decoder network. The attention decoder network module 206 receives partitions from the synchronization module 209, each partition including a portion of the encoder state sequence, and then computes an attention-based posterior probability distribution of the label using the decoder network reading parameters from decoder network parameters 205.

End-to-end speech recognition is generally defined as a problem to find the most probable label sequence $\hat{Y}$ given input acoustic feature sequence X, i.e.

$$\hat{Y} = \underset{Y \in \mathcal{U}^*}{\arg\max}\, p(Y|X), \tag{1}$$

where $\mathcal{U}^*$ denotes a set of possible label sequences given a set of pre-defined labels $\mathcal{U}$.

In end-to-end speech recognition, p(Y|X) is computed by a pre-trained neural network without pronunciation lexicon and without a heavy weighted finite state transducer (WFST)-based graph search. In the attention-based end-to-end speech recognition of a related art, the neural network consists of an encoder network and a decoder network.

Examples of Encoder

The encoder network module 203 includes an encoder network used to convert acoustic feature sequence $X = x_1, \ldots, x_T$ into embedding vector sequence $X_E = x_1^E, \ldots, x_N^E$ as $$X_E = \text{Encoder}(X), \tag{2}$$

where function Encoder(X) may include one or more recurrent neural networks (RNNs), convolutional neural networks (CNN), feed-forward neural networks, or self-attention neural networks, which are stacked to a deep architecture. An RNN may be implemented as a Long Short-Term Memory (LSTM), which has an input gate, a forget gate, an output gate, and a memory cell in each hidden unit. Another RNN may be a bidirectional RNN (BRNN) or a bidirectional LSTM (BLSTM). A BLSTM is a pair of LSTM RNNs, one is a forward LSTM and the other is a backward LSTM. An embedding vector of the BLSTM is obtained as a concatenation of hidden vectors of the forward and backward LSTMs.

With the forward LSTM, the forward n-th hidden vector $h_t^F$ is computed as $$h_t^F = o_t^F \odot \tanh(c_t^F) \tag{3}$$

$$o_t^F = \sigma(W_{xo}^F x_t + W_{xc}^F h_{t-1}^F + b_o^F) \tag{4}$$

$$c_t^F = f_t^F \odot c_{t-1}^F + i_t^F \odot \tanh(W_{xc}^F x_t + W_{hc}^F h_{t-1}^F + b_c^F) \tag{5}$$

$$f_t^F = \sigma(W_{xf}^F x_t + W_{hg}^F h_{t-1}^F + b_f^F) \tag{6}$$

$$i_t^F = \sigma(W_{xi}^F x_t + W_{hi}^F h_{t-1}^F + b_i^F). \tag{7}$$

where $\sigma(\cdot)$ is the element-wise sigmoid function, $\tanh(\cdot)$ is the element-wise hyperbolic tangent function, and $i_t^F$, $f_t^F$, $o_t^F$ and $c_t^F$ are the input gate, forget gate, output gate, and cell activation vectors for $x_t$, respectively. $\odot$ denotes the element-wise multiplication between vectors. The weight matrices $W_{zz}^F$ and the bias vector $b_z^F$ are the parameters of the LSTM, which are identified by the subscript $z \in \{x, h, i, f, o, c\}$. For example, $W_{hi}^F$ is the hidden-to-input gate matrix and $W_{xo}^F$ is the input-to-output gate matrix. The hidden vector $h_t^F$ is obtained recursively from the input vector $x_t$ and the previous hidden vector $h_{t-1}^F$, where $h_0^F$ is assumed to be a zero vector.

With the backward LSTM, the backward t-th hidden vector $h_t^B$ is computed as $$h_t^B = o_t^B \odot \tanh(c_t^B) \tag{8}$$

$$o_t^B = \sigma(W_{xo}^B x_t + W_{xc}^B h_{t+1}^B + b_o^B) \tag{9}$$

$$c_t^B = f_t^B \odot c_{t+1}^B + i_t^B \odot \tanh(W_{xc}^B x_t + W_{hc}^B h_{t+1}^B + \tag{10}$$

$$f_t^B = \sigma(W_{xf}^B x_t + W_{hg}^B h_{t+1}^B + b_f^B) \tag{11}$$

$$i_t^B = \sigma(W_{xi}^B x_t + W_{hi}^B h_{t+1}^B + b_i^B). \tag{12}$$

where $i_t^B$, $f_t^B$, $o_t^B$ and $c_t^B$ are the input gate, forget gate, output gate, and cell activation vectors for $x_t$, respectively. The weight matrices $W_{zz}^B$ and the bias vector $b_z^B$ are the parameters of the LSTM, which are identified by the subscript in the same manner as the forward LSTM. The hidden vector $h_t^B$ is obtained recursively from the input vector $x_t$ and the succeeding hidden vector $h_{t+1}^B$, where $h_{T+1}^B$ is assumed to be a zero vector.

The hidden vector of the BLSTM is obtained by concatenating the forward and backward hidden vectors as $$h_t = [h_t^{F^T}, h_t^{B^T}]^T \qquad (13)$$

where T denotes the transpose operation for the vectors assuming all the vectors are column vectors. $W_{zz}^F$, $b_z^F$, $W_{zz}^B$, and $b_z^B$ are considered the parameters of the BLSTM.

To obtain better hidden vectors, some implementations stack multiple BLSTMs by feeding the hidden vectors of the first BLSTM to the second BLSTM, then feeding the hidden vectors of the second BLSTM to the third BLSTM, and so on. If $h_t'$ is a hidden vector obtained by one BLSTM, $x_t = h_t'$ when feeding it to another BLSTM. To reduce the computation, some embodiments may feed only every second hidden vectors of one BLSTM to another BLSTM. In this case, the length of output hidden vector sequence becomes the half of the length of input acoustic feature sequence.

Figure 2B:
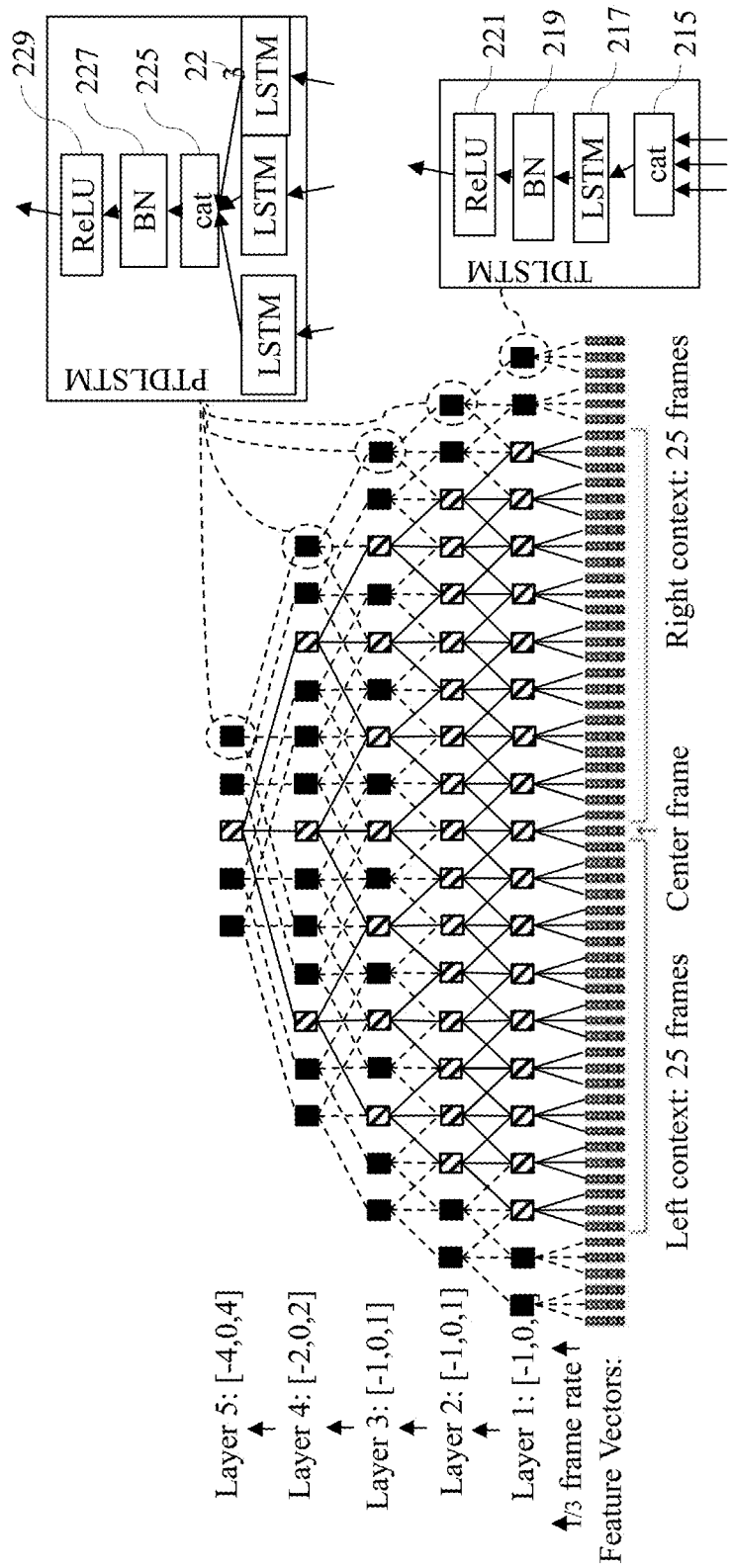
FIG. 2B illustrates implementation of the encoder using deep time-delay architecture according to an example embodiment.

In an example embodiment, the encoder module is implemented using time-delayed long short-term memory (TDLSTM) neural network and a parallel time-delayed LSTM (PTDLSTM) neural network composed together using deep time-delay architecture. FIG. 2B illustrates implementation of the encoder module using deep time-delay architecture. In FIG. 2B, the encoder architecture using the deep time-delay structure is illustrated on the left and the neural network building blocks are illustrated on the right. Each rectangle box of the deep time-delay structure represents either the TDLSTM building block, in Layer 1, or a PTDLSTM building block, in Layers 2-5. The numbers in square brackets denote the frame delayed inputs to each layer. The solid black lines and the shaded rectangles highlight the path of a single encoder output frame. The dashed lines and the dark rectangles denote connections and building blocks to generate past and future encoder output frames.

In this example, the deep time-delay architecture generates a delay of 25 input acoustic frames in sum corresponding to 250 ms. The first neural network layer (Layer-1) includes a TDLSTM building block that takes as input three consecutive acoustic frames, whereby an output is generated at a three-times lower frame rate, i.e., subsampling by a factor of three is applied. The remaining encoder neural network layers, i.e., layers 2-5, are based on PTDLSTM. Each of the TDLSTM and PTDLSTM neural network architecture comprises multiple layers of neural network blocks. Further, each layer of the multiple layers may be composed of different neural network building blocks. The architectures of the TDLSTM and PTDLSTM are explained below.

The different neural network building blocks comprised in TDLSTM are: input concatenation (cat) block 215, an LSTM layer (LSTM) block 217, a bottleneck (BN) feed-forward neural network block 219, and a rectified linear unit activation function (ReLU) block 221. The input concatenation block 215 first concatenates all the input acoustic frames and provides the concatenated input acoustic frames to the LSTM block 217. The LSTM block 217 processes the time-delayed and concatenated input prior to the bottleneck feed-forward neural network 219. The bottleneck feed-forward neural network block 219 reduces the input size of acoustic frames to the following layers i.e. ReLU block 221. The ReLU is an activation function that produces final encoder states that encode transcription outputs for the input acoustic frames received from the bottleneck feed-forward neural network block 219.

Further, the PTDLSTM network architecture comprises LSTM layers 223, a concatenation block 225, a bottleneck feed-forward neural network block 227, and a rectified linear unit activation function (ReLU) block 229. In PTDLSTM network, each time-delayed input acoustic frame is processed by separate LSTMs in LSTM layer 223, and LSTM outputs are provided to the concatenation block 225. The concatenation block 225 concatenates LSTM outputs before forwarding concatenated LSTM outputs to the bottleneck feed-forward neural network block 227 and the rectified linear unit (ReLU) activation function 229 in order to produce final encoder states encoding transcription outputs for the input acoustic frames.

The TDLSTM encoder architecture as well as the PTDLSTM architecture improve error rates as well as inference speed of an ASR system compared to other RNN-based streaming encoder architectures such as a latency-controlled BLSTM, which applies block processing and restricts the backward LSTM to a limited future context. For example, these architectures limit the processing latency to a fixed amount and enable usage for streaming ASR. In addition, the PTDLSTM architecture demonstrates advantages in terms of word error rates compared to other RNN-based streaming architectures, such as a latency-controlled BLSTM architecture.

Example of LSD Module

In some embodiments, the LSD module is implemented using an attention-based decoder. The attention-based decoder network module 206 includes a decoder network used to compute label sequence probability $p(Y|X)$ using embedding vector sequence $X_E$. Suppose Y is an L-length label sequence $y_1, y_2, \ldots, y_L$. To compute $p(Y|X)$ efficiently, the probability can be factorized by a probabilistic chain rule as $$p(Y|X) = \prod_{l=1}^{L} p(y_l | y_1, \ldots, y_{l-1}, X), \qquad (14)$$

and each label probability $p(y_l|y_1, \ldots, y_{l-1}, X)$ is obtained from a probability distribution over labels, which is estimated using the decoder network as $$p(y|y_1, \ldots, y_{l-1}, X) = \text{Decoder}(r_l, q_{l-1}), \qquad (15)$$

where y is a set of integers representing each label output, $r_l$ is called a content vector, which has content information of $X_E$. $q_{l-1}$ is a decoder state vector, which contains contextual information of the previous labels $y_1, \ldots, y_{l-1}$ and the previous content vectors $r_0, \ldots, r_{l-1}$. Accordingly, the label probability is obtained as the probability of $y = y_l$ given the context, i.e.

$$p(y_l|y_1, \ldots, y_{l-1}, X) = p(y = y_l|y_1, \ldots, y_{l-1}, X) \qquad (16)$$

The content vector $r_l$ is usually given as a weighted sum of embedding vectors of the encoder network, i.e.

$$r_l = \sum_n a_{ln} x_n^E, \qquad (17)$$

where $a_{ln}$ is called an attention weight that satisfies $\Sigma_n a_{ln} = 1$.

The attention weights can be computed using $q_{l-1}$ and $X_E$ as $$e_{ln} = w^T \tanh(W q_{l-1} + V x_n^E + U f_{ln} + b) \tag{18}$$

$$f_l = F * a_{l-1} \tag{19}$$

$$a_{ln} = \frac{\exp(e_{ln})}{\sum_n \exp(e_{ln})} \tag{20}$$

where W, V, F and U are matrices, and w and b are vectors, which are trainable parameters of the decoder network. $e_{ln}$ is a matching score between the (l−1)-th state vector $q_{l-1}$ and the t-th hidden vector $x_n^E$ to form a temporal alignment distribution $a_l = \{a_{ln} | n=1, \ldots, N\}$. $a_{l-1}$ represents the previous alignment distribution $\{a_{(l-1)n} | n=1, \ldots, N\}$ used for predicting the previous label $y_{l-1}$. $f_l = \{f_{ln} | t=1, \ldots, N\}$ is the convolution result with F for $a_{l-1}$, which is used to reflect the previous alignment to the current alignment. "*" denotes a convolution operation.

The label probability distribution is obtained with state vector $q_{l-1}$ and content vector $r_l$ as $$\text{Decoder}(r_l, q_{l-1}) = \text{softmax}(W_{qy} q_{l-1} + W_{ry} r_l + b_y), \tag{21}$$

where $W_{qy}$ and $W_{ry}$ are matrices and $b_y$ is a vector, which are trainable parameters of the decoder network. The softmax( ) function is computed as $$\text{softmax}(v) = \frac{\exp(v[i])}{\sum_{j=1}^{K} \exp(v[i])} \bigg|_{i=1,\ldots,K} \tag{22}$$

for a K-dimensional vector v, where v[i] indicates the i-th element of v.

After that, decoder state vector $q_{l-1}$ is updated to $q_l$ using an LSTM as $$q_l = o_l^D \odot \tanh(c_l^D) \tag{23}$$

$$o_l^D = \sigma(W_{xo}^D x_l^D + W_{xc}^D q_{l-1} + b_o^D) \tag{24}$$

$$c_l^D = f_l^D \odot c_{l-1}^D + i_l^D \odot \tanh(W_{xc}^D x_l^D + W_{hc}^D q_{l-1} + b_c^D) \tag{25}$$

$$f_l^D = \sigma(W_{xf}^D x_l^D + W_{hg}^D q_{l-1} + b_f^D) \tag{26}$$

$$i_l^D = \sigma(W_{xi}^D x_l^D + W_{hi}^D q_{l-1} + b_i^D). \tag{27}$$

where $i_l^D$, $f_l^D$, $o_l^D$ and $c_l^D$ are the input gate, forget gate, output gate, and cell activation vectors for input vector $x_l$, respectively. The weight matrices $W_{zz}^D$ and the bias vector $b_z^D$ are the parameters of the LSTM, which are identified by the subscript in the same manner as the forward LSTM. The state vector $q_l$ is obtained recursively from the input vector $x_l^D$ and the previous state vector $q_{l-1}$, where $q_0$ is computed assuming $q_{-1}=0$, $y_0=\text{<sos>}$, and $a_0=1/T$. For the decoder network, the input vector $x_l^D$ is given as a concatenated vector of label $y_l$ and content vector $r_l$, which can be obtained as $x_l^D = [\text{Embed}(y_l)^T, r_l^T]^T$, where Embed(•) denotes label embedding, that converts a label into a fixed dimensional vector.

In attention-based speech recognition, estimating appropriate attention weights is very important to predict correct labels, since content vector $r_l$ is deeply dependent on alignment distribution $a_l$ as shown in Eq. (17). In speech recognition, the content vector represents acoustic information in the encoder's hidden vectors around the peak of the alignment distribution, and the acoustic information is the most important clue to predict label $y_l$. Nevertheless, the attention mechanism often provides irregular alignment distributions because there is no explicit constraint so that the peak of the distribution proceeds monotonically along time when incrementally predicting $y_l$. In speech recognition, the alignment between input sequence and output sequence should be monotonic in general. Although the convolution feature $f_{lt}$ alleviates generating irregular alignments, it cannot guarantee to avoid them.

Figure 2C:
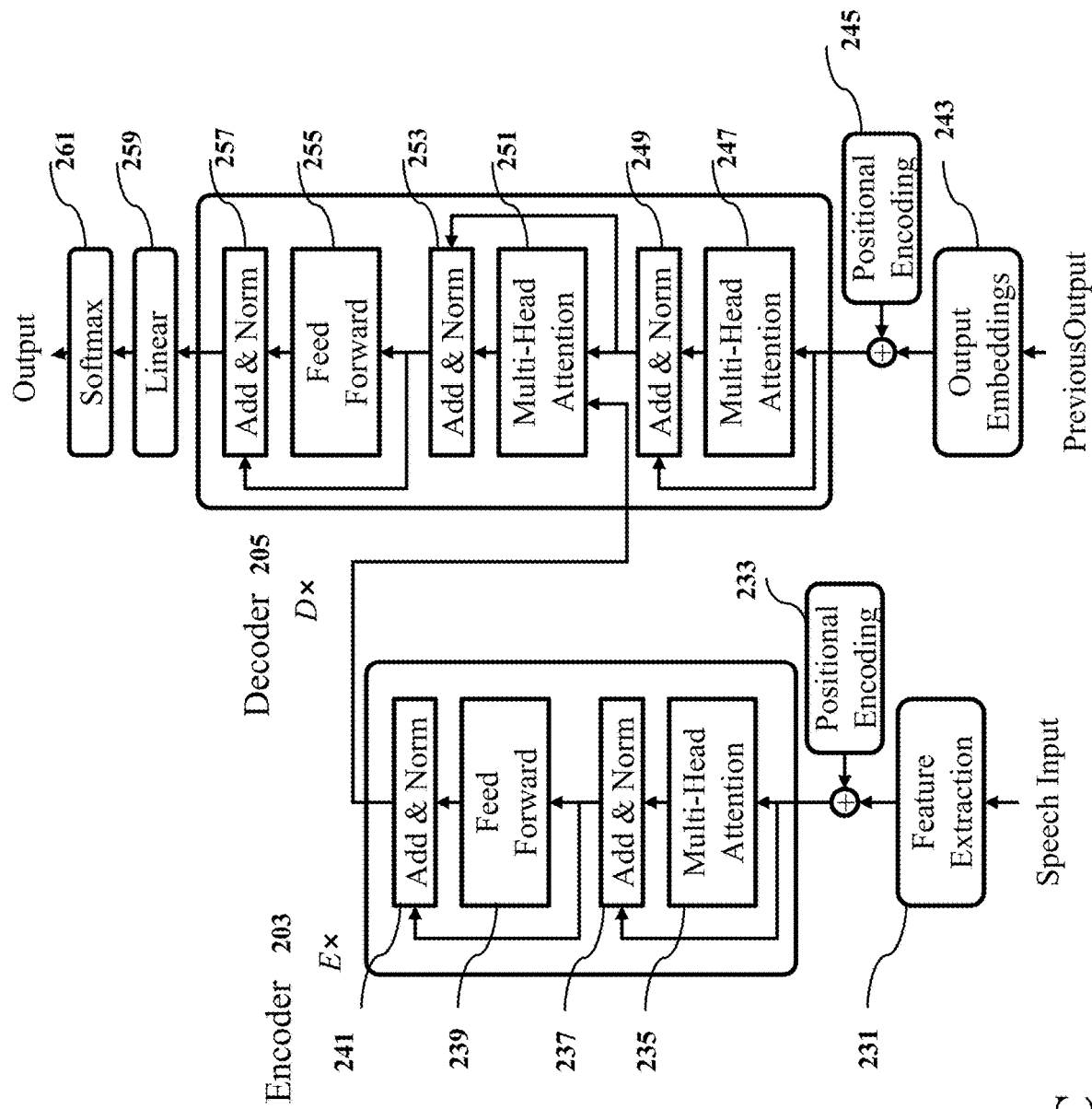
FIG. 2C illustrates transformer architecture for implementation of the LSD module and the encoder neural network according to an example embodiment.

In another embodiment, the LSD module and the encoder module are implemented using the transformer architecture. FIG. 2C illustrates the transformer architecture for the implementation of the LSD module and the encoder neural network. The transformer architecture illustrated in FIG. 2C is an alternative to RNN-based encoder and LSD architectures. The encoder 203 receives a sequence of input frames, where each frame of the sequence comprises features associated with speech input. These features can be extracted by a feature extraction module 231. The encoder 203 neural network includes E stacked layers having the same structure, where each layer has two sub-layers: first is a multi-head self-attention mechanism 235 and second is a feed-forward neural network layer 239. For better optimization the encoder 203 uses residual connections followed by layer normalization 237, 241 for each sub-layer. In addition, a positional encoding 233 is added to the input of the encoder 203, which assures that the multi-head self-attention 235 can identify the position of frames within a sequence of frames. In some embodiments, the multi-head self-attention mechanism uses restricted self-attention in order to control the latency of the encoder neural network and to enable streaming application.

Further, the decoder 205 also includes D stacked layers, where each layer has a multi-head self-attention layer 247 to process the output of a previous decoder block (where the first decoder block sees the output of the last decoder block from a previous processing step) provided by output embedding 243. Further, a relative or absolute frame position information in the sequence of output embeddings computed from the previous decoding step is provided to the decoder using positional encoding 245 at the inputs of decoder 205. The decoder 205 includes a multi-head encoder-decoder attention layer 251 to process the output of the encoder neural network 203 using a query vector generated by the multi-head self-attention layer 247. The output of the encoder-decoder attention layer 251 is fed to a feed-forward neural network layer 255. Further, similar to the encoder 203, the decoder 205 uses residual connections followed by layer normalization 249, 253, 257 for each sub-layer for improved generalization and regularization. A learned linear transformation 259 and softmax function 261 are used to convert the decoder output to predicted label output probabilities.

Examples of FSD Module

In one embodiment, the FSD module is implemented using CTC neural network as described above. The CTC module 211 computes a CTC forward probability of label sequence Y given the embedding vector sequence $X_E$. Note that the CTC formulation uses L-length label sequence $Y=(y_1, \ldots, y_L)$ where $y_i \in \mathcal{U}$ and $\mathcal{U}$ is a set of distinct labels. By introducing the frame wise label sequence $Z=(z_1, \ldots, z_N)$ with $z_n \in \mathcal{U} \cup \{\epsilon\}$, where $\epsilon$ represents an additional blank label, and using the probabilistic chain rule and conditional independence assumption, the posterior distribution p(Y|X) is factorized as follows:

$$p(Y|X) \approx \sum_Z p(Y|Z) p(Z|X) \approx \qquad (28)$$

$$\sum_Z p(Y|Z) \prod_n p(z_n|X) \approx \sum_Z \prod_n p(z_n|z_{n-1}, Y) p(z_n|X),$$

where $p(z_n|z_{n-1}, Y)$ is considered a label transition probability including blank labels. $p(z_n|X)$ is the framewise posterior distribution conditioned on the input sequence X, and modeled by using an encoder neural network as described above followed by a linear transform and a softmax function:

$$p(z_n|X) = \text{softmax}(W_{hy}^{CTC} x_n^E + b_y^{CTC}), \qquad (29)$$

where $x_n^E$ is obtained with an encoder network. $W_{hy}^{CTC}$ is a weight matrix and $b_y^{CTC}$ is a bias vector, which are trainable parameters of the CTC model. Although Eq. (28) has to deal with a summation over all possible Z, it can be efficiently computed by using the forward-backward algorithm and dynamic programming.

For example, the forward algorithm for CTC is performed as follows. Some implementations use an extended label sequence $Y' = y'_1, y'_2, \ldots, y'_{2L+1} = \epsilon, y_1, \epsilon, y_2, \ldots, \epsilon, y_L, \epsilon$ of length 2L+1, where a blank label $\epsilon$ is inserted between each pair of adjacent labels. Let $\alpha_t(s)$ be a forward probability, which represents the posterior probability of label sequence $y_1, \ldots, y_l$ for time frames $1, \ldots, t$, where s indicates the position in the extended label sequence Y'. For initialization, we set $$\alpha_1(1) = p(z_1 = \epsilon|X) \qquad (30)$$

$$\alpha_1(2) = p(z_1 = y_1|X) \qquad (31)$$

$$\alpha_1(s) = 0, \forall s > 2. \qquad (32)$$

For t=2 to T, $\alpha_t(s)$ is computed recursively as $$\alpha_t(s) = \begin{cases} \overline{\alpha}_t(s) p(z_t = y'_s | X) & \text{if } y'_s = b \text{ or } y'_{s-2} = y'_s \\ (\overline{\alpha}_t(s) + \alpha_{t-1}(s-2)) p(z_t = y'_s | X) & \text{otherwise} \end{cases}, \qquad (33)$$

where $$\overline{\alpha}_t(s) = \alpha_{t-1}(s) + \alpha_{t-1}(s-1). \qquad (34)$$

Finally, the CTC-based label sequence probability is obtained as $$p(Y|X) = \alpha_T(2L+1) + \alpha_T(2L). \qquad (35)$$

The framewise label sequence Z represents an alignment between input acoustic feature sequence X and output label sequence Y. When computing the forward probability, the recursion of Eq. (33) enforces Z to be monotonic and does not allow looping or big jumps of s in alignment Z, because the recursion to obtain $\alpha_t(s)$ only considers at most $\alpha_{t-1}(s)$, $\alpha_{t-1}(s-1)$, $\alpha_{t-1}(s-2)$. This means that when time frame proceeds one frame, the label changes from the previous label or blank, or keeps the same label. This constraint plays a role of the transition probability $p(z_t|z_{t-1}, Y)$ that enforces alignments to be monotonic. Hence, p(Y|X) can be 0 or a very small value when it is computed based on irregular (non-monotonic) alignments. The alignment between input acoustic feature sequence X and output label sequence Y is used by the synchronization module 209 to control the operation of the attention-based neural network 206.

Figure 2D:
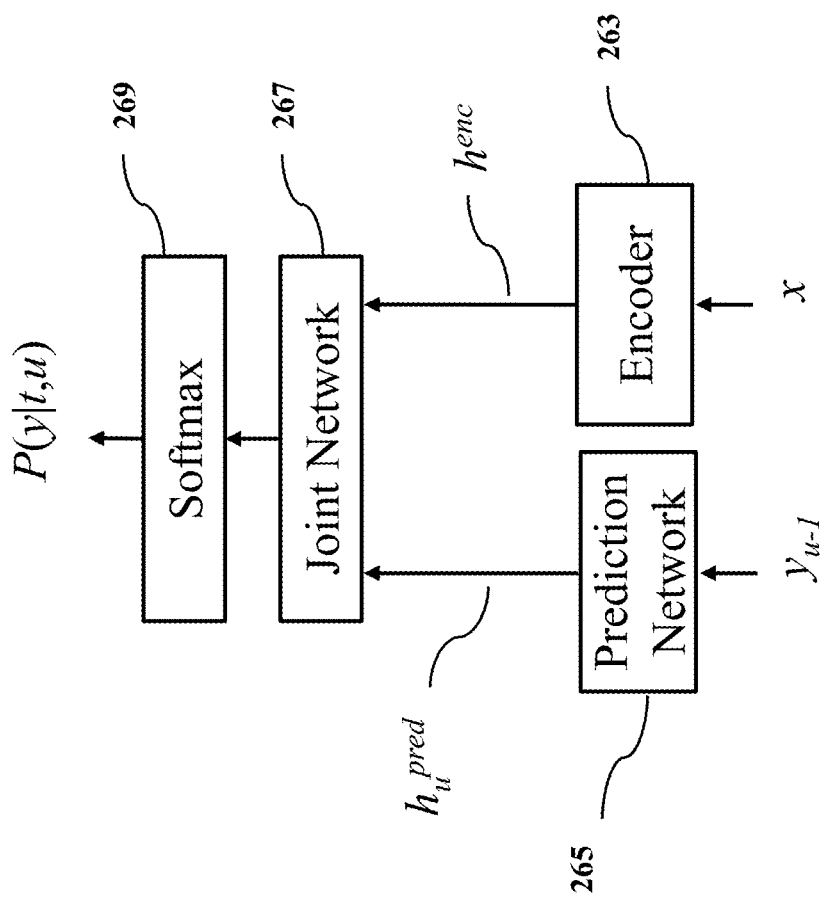
FIG. 2D illustrates implementation of the FSD module using the recurrent neural network-transducer (RNN-T) architecture.

In an embodiment the FSD module may be implemented using recurrent neural network (RNN) transducer architecture. FIG. 2D illustrates implementation of the FSD module based on the recurrent neural network-transducer (RNN-T) architecture. The RNN-T is an extension to connectionist temporal classification (CTC). The RNN-T comprises an encoder 263, a prediction network 265, a joint network 267, and a softmax function 269. The encoder 263 transforms the input acoustic frame sequence $X = (x_0, \ldots, x_T)$ to a high-level feature representation $h^{enc}$.

$$h^{enc} = \text{Encoder}(X) \qquad (36)$$

The prediction network can remove the limitation of frame independent assumption in CTC architecture. The prediction network can adopt a long short-term memory (LSTM) neural network to model context information which leads to transformation of original vector $y = (y_1, \ldots, y_{l-1})$ to high-level representation $h_l^{pred}$. The output of prediction network is determined by previous context information. Note that the first input of prediction network is an all-zero tensor and y is a non-blank unit. Equation (37) and equation (38) describe how prediction net operates at label step l. The joint network is usually a feed-forward network which produces $h_{n,l}^{joint}$ from $h_n^{enc}$ and $h_l^{pred}$ $$h_{n,l}^{joint} = \tanh(W^{enc} h_n^{enc} + W^{pred} h_l^{pred} + b) \qquad (37)$$

Finally, the posterior for each output token k is computed by applying a softmax operation $$P(k|n, l) = \text{softmax}(h_{n,l}^{joint}) \qquad (38)$$

The whole network is trained by optimizing the RNN-T loss function $$\text{Loss}_{rnnt} = -\ln(P(Y|X)), \qquad (39)$$

which is computed by forward-backward algorithm.

For the RNN-T decoding, the most likely sequence of characters is generated by beam search algorithm. During inference, the input to the prediction network is the last non-blank symbol. The final output sequence is obtained by removing all blank symbols in the most likely sequence path.

Figure 3A:
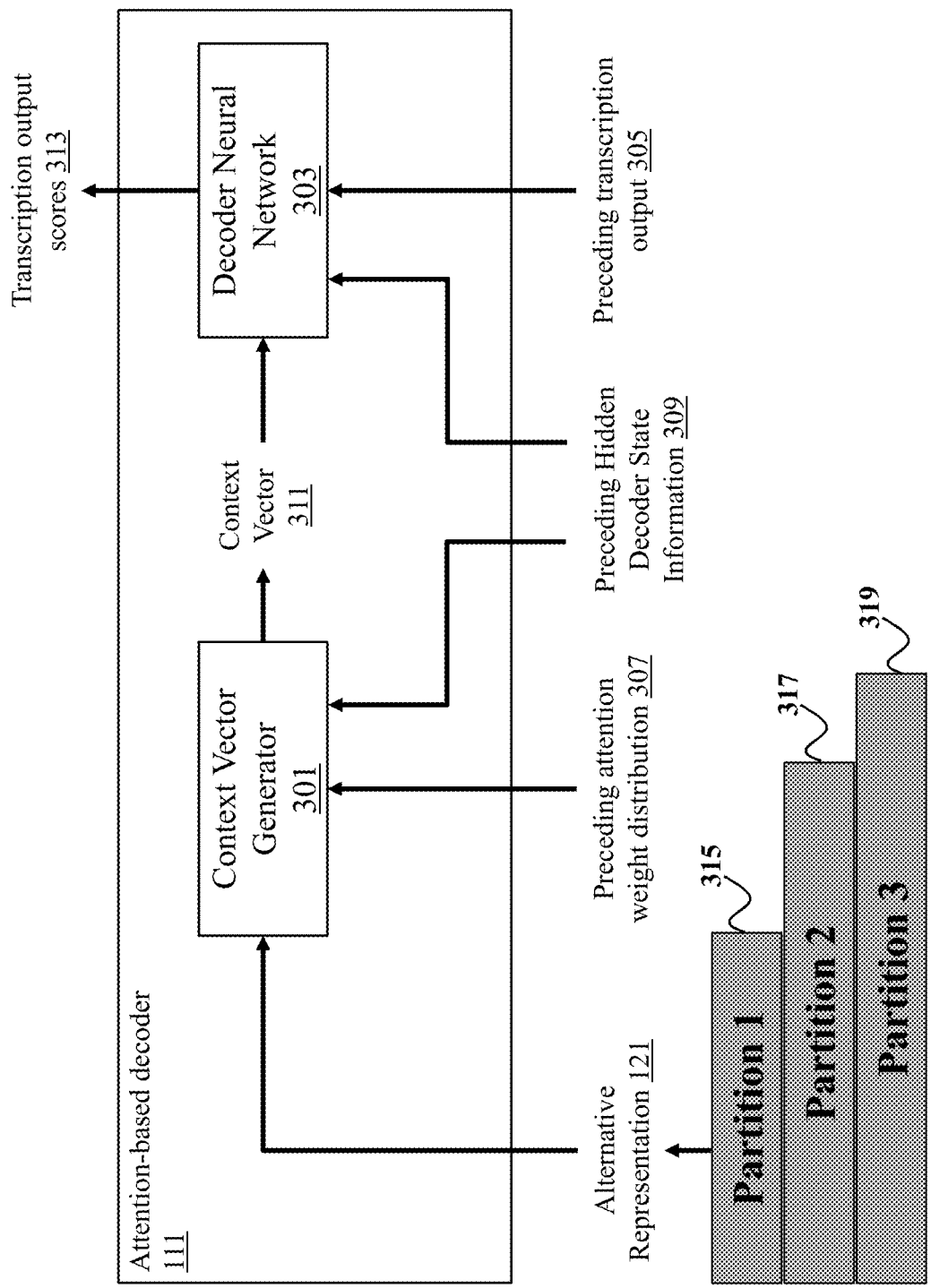
FIG. 3A illustrates an exemplary architecture for implementation of the LSD module as an attention-based decoder with hidden decoder state of previous time step, according to some embodiments.

Some embodiments are based on recognition that the accuracy of recognition can be further improved by combining decoder outputs from CTC and attention-based decoders. For example, in one implementation of the end-to-end speech recognition, CTC forward probabilities in Eq. (34) are combined with attention-based probabilities in Eq. (14) to obtain more accurate label sequence probabilities. The transducer architecture comprises prediction network 251, encoder 253, joint network 255, and softmax function 257, where the encoder network can be shared with an attention-based decoder network for joint training and recognition FIG. 3A illustrates an exemplary architecture for implementation of LSD module as an attention-based decoder with an RNN-based decoder according to some embodiments. The attention-based decoder 111 comprises context vector generator 301 and a decoder neural network 303. The context vector generator 301 receives as input the hidden decoder state 309 of the decoder neural network 303 from the preceding time step, the attention weight distribution 307 of the context vector generator 301 from the preceding time step, and the alternative representation 121, i.e., the alternative representation of the stream of acoustic frames 101 described above with reference to FIG. 1A. The context vector generator 301 processes the preceding hidden decoder state of the decoder neural network 303, the preceding attention weight distribution 307, and the alternative representation 121 to compute an attention weight distribution over the time frames of the alternative representation 121 and to generate as output a context vector 311 for the current time step. The context vector generator 301 provides the context vector 311 for the current time step to the decoder neural network 303.

For different iterations, the attention-based decoder 111 receives different partitions 315, 317, and 319. For example, the set of partitions include a first partition 315 and subsequent partitions 317 and 319. The attention-based decoder 111 processes the first partition 315 to produce a first transcription output. After the attention-based neural network finished processing the first partition that places the attention-based network in its internal state, the attention-based decoder 111 processes the subsequent partitions 317, 319 with the attention-based network without resetting the internal state of the attention-based network to produce transcription outputs for the subsequent partitions one after another.

In effect, the attention-based decoder 111 processes different partitions without resetting an internal state of the attention-based network to take advantage of previously decoded information. Upon determining an end of the speech utterance, the attention-based decoder 111 is configured to reset its internal states.

In another embodiment, when the attention-based decoder 111 receives subsequent partitions 317, 319, an internal state of the attention-based decoder 111 is reset by each of the subsequent partitions 317, 319 to produce transcription outputs for the subsequent partitions 317, 319 one after another.

The decoder neural network 303 receives as input, the context vector 311 for the time step as well as the transcription output 313 and the hidden decoder state 309 of the preceding time step. The decoder neural network 303 initializes its internal hidden states with the preceding hidden decoder states 309 prior to processing the context vector 311 for the time step and the transcription output 313 from the preceding time step to generate as output, a set of transcription output scores 313 for the time step. In some implementations, the decoder neural network 303 is a recurrent neural network (RNN) with a softmax output layer. Each transcription output score corresponds to a respective transcription output from a set of transcription outputs. For example, as described above with reference to FIG. 1A, the set of transcription outputs may be a character or a sequence of characters from a Unicode character set which is used to write one or more natural languages, e.g., the alphabet of English, Asian, Cyrillic, and Arabic languages. The transcription output set may also include Arabic numerals, a space character, and punctuation marks. The score for a given transcription output represents likelihood that the corresponding transcription output is the current transcription piece at the time step in an output sequence that is a transcription of the utterance.

The ASR system processes the transcription output scores 313 for each time step to determine a transcription output sequence that represents a transcription of an utterance. For example, for each time step, the speech recognition system may select the transcription output with the highest score from the set of transcription output scores to determine the transcription output sequence.

Figure 3B:
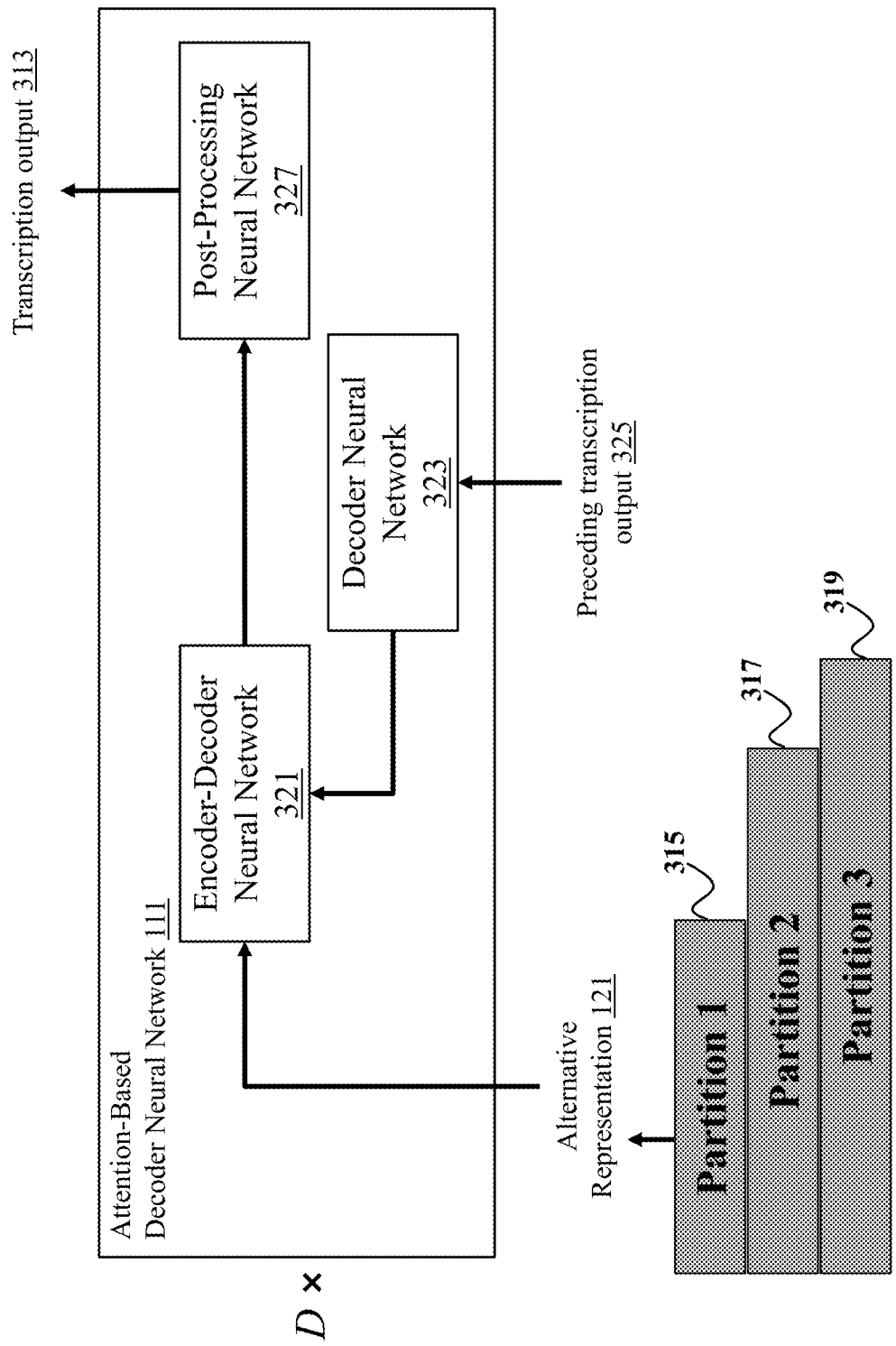
FIG. 3B illustrates an exemplary architecture for implementation of the LSD module as an attention-based decoder without hidden decoder state of previous time step, according to some embodiments

FIG. 3B illustrates an exemplary architecture for implementation of LSD module as an attention-based decoder without hidden decoder state of previous time step according to some embodiments. The architecture illustrated in FIG. 3B is an alternative to the architecture presented in FIG. 3A, where the attention-based decoder 111 can be based on a different decoder neural network building block 303 that does not require hidden decoder state of the previous time step. Instead the building block 303 requires the preceding transcription output 325 as depicted in FIG. 3B. In some implementations, the decoder neural network 323 is based on self-attention neural networks to generate a decoder state, which is used by the encoder-decoder neural network 321 to provide attention to an input encoder state sequence partition prior to being fed to the post-processing neural network 327. The post processing neural network 327 generates a transcription output. Such an attention-based decoder neural network building block 111 can be repeated D-times, where the transcription output is input to the next decoder building block.

Exemplar Implementations

Figure 4:
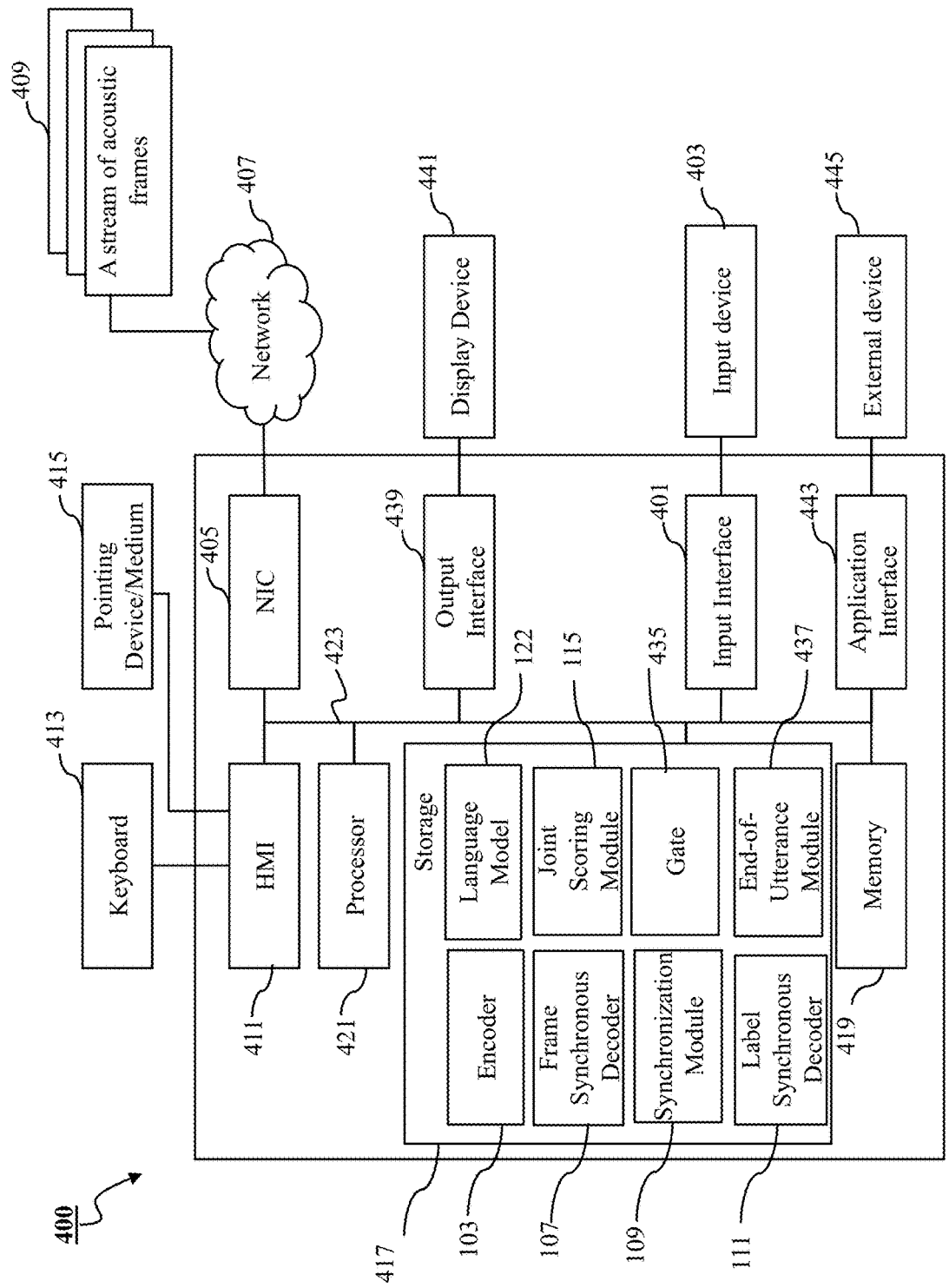
FIG. 4 illustrates a block diagram of a computer-based automatic speech recognition system, in accordance with some embodiments.

FIG. 4 illustrates a block diagram of a computer-based automatic speech recognition system 400 in accordance to some embodiments. The computer-based speech recognition system 400 includes a number of interfaces connecting the system 400 with other systems and devices. The system 400 includes an input interface 401 configured to accept a stream of acoustic frames representing features of a speech utterance from input device 403. The input device 403 can be a microphone. Additionally or alternatively, the computer-based speech recognition system 400 can receive the acoustic signals from various other types of input interfaces. In some embodiments, the system 400 includes an audio interface configured to the stream of acoustic frames from acoustic input devices 403. In some other embodiments, the input interface includes a network interface controller (NIC) 405 configured to stream of acoustic frames 409, via network 407, which can be one or combination of wired and wireless network.

The network interface controller (NIC) 405 is adapted to connect the system 400 through a bus 423 to the network 407 connecting the system 400 with sensing devices, for example, input device 403 such as the microphone. Additionally, or alternatively, the system 400 can include a human machine interface (HMI) 411. The human machine interface 411 within the system 400 connects the system 400 to a keyboard 413 and pointing device 415, wherein the pointing device 415 can include a mouse, trackball, touchpad, joy stick, pointing stick, stylus, or touchscreen, among others.

The system 400 includes a processor 421 configured to execute stored instructions 417, as well as a memory 419 that stores instructions that are executable by the processor. The processor 421 can be a single core processor, a multi-core processor, a computing cluster, or any number of other configurations. The memory 419 can include random access memory (RAM), read only memory (ROM), flash memory, or any other suitable memory systems. The processor 421 can be connected through the bus 423 to one or more input and output devices.

The instructions 417 can implement a method for end-to-end speech recognition, according to some embodiments. To that end, the computer memory 419 stores an encoder 103, a frame-synchronous decoder (FSD) module 107, a synchronization module 109, a label-synchronous decoder (LSD) module 431 and a joint scoring module 115, a gate 435 and end-of-utterance module 437. In some embodiments, the automatic speech recognition system (ASR) 400 is configured for recognition in a streaming/online manner. For example, the gate 435 is configured to partition the speech utterance into a set of acoustic sequences. For example, in some embodiments the gate is implemented as part of the input interface 401 partitioning the speech during its conversion. The length of each acoustic sequence in the set can be the same or can vary based on the features of the pronounced speech. In such a manner, the ASR system 400 transcribes input acoustic sequences in a streamline manner. In some embodiments, the gate 435 partitions the speech utterance into blocks of acoustic signals, such that the input interface receives one block of acoustic signal at the time. For example, the gate 435 can be a voice activity detection module removing non-speech acoustic inputs.

The encoder 103 is trained to convert the stream of acoustic frames 409 representing features of the speech utterance into a sequence of encoder states of encoded acoustic feature frames. In some embodiments, the processor 421 is configured to submit the sequence of encoder states to submit the sequence of encoder states frame by frame to the FSD module 107. According to some embodiments, the FSD module 107 can be a connectionist temporal classification (CTC) trained to determine locations of encoder states in the sequence of encoder states that encode transcription outputs. In some embodiments, the FSD module 107 is configured to successively process each encoder state of encoded acoustic features to identify an encoder state that updates a list of prefixes and associated scores maintained by the FSD module 107. Each prefix corresponds to candidate estimation of decoded transcription outputs. Further, in some embodiments, the associated score corresponds to a probability of transcription output of the prefix. In some other embodiments, the associated score corresponds to the sum of all transcription output probabilities that lead to the same prefix.

The synchronization module 109 is configured to select a portion of the sequence of encoder states including the encoder state identified by the FSD module 107 in response to update of the list of prefixes maintained by the FSD module 107. In some embodiments, the synchronization module 109 is configured to partition the sequence of encoder states into a set of partitions based on the locations of the identified encoder states and submit the set of partitions sequentially into the LSD module 111. In some embodiments, the LSD module 111 can be an attention-based decoder.

In some embodiments, the LSD module 111 is configured to process the selected portion of the sequence of encoder states to update a list of prefixes maintained by the LSD module 111 with at least one likely estimation of the transcription outputs. As the LSD module 111 and FSD module 107 process same list of prefixes, synchronization is achieved between the LSD module decoder 111 and FSD module 107. Further, decoding the selected portion of the sequence of encoder states synchronizes time of decoding by the FSD module 107 and the LSD module 111.

The joint scoring module 115 is configured to combine probabilities of corresponding prefixes in the updated list of prefixes maintained by the FSD module 107 and the updated list of prefixes maintained by the LSD module 111 to produce a joint list of prefixes having best highest combine probabilities. Further, in some embodiments, the joint scoring module 115 is configured to replace the list of prefixes maintained by the FSD module 107 with the joint list of prefixes to synchronize prefixes of the FSD module 107 and LSD module 111 for subsequent decoding over subsequent time steps. Furthermore, in some embodiments, the joint scoring module 115 is configured to output prefixes corresponding to the highest joint scores as a current portion of transcription of the incoming stream for a current time step.

In some embodiments, the memory 419 also stores an end-of-utterance module 437 configured to detect the end of the speech utterance. Different embodiments use different techniques to implement the end-of-utterance module 437. For example, some embodiments use speech activity detection (SAD) module to detect the end of an utterance or a combination of SAD and an auxiliary end point detection system.

The automatic speech recognition system 400 includes an output interface 439 configured to output the transcription outputs of the system 400. For example, if a transcription output represents a character, the output interface 439 outputs character by character. Similarly, if the transcription output represents a word, the output interface 439 outputs word by word. Additionally, or alternatively, in one embodiment, the output interface 439 is configured to accumulate a set of transcription outputs to form a word and output each word in the speech utterance individually. Further, in one embodiment the output interface is configured to output each transcription output individually or together with other outputs.

In some embodiments, the output interface 439 can display the transcription outputs on a display device 441, store the transcription outputs into storage medium and/or transmit the transcription outputs over the network 407. Examples of a display device 441 include a computer monitor, television, projector, or mobile device, among others. The system 400 can also be connected to an application interface 443 adapted to connect the system 400 to an external device 445 for performing various tasks.

Figure 5:
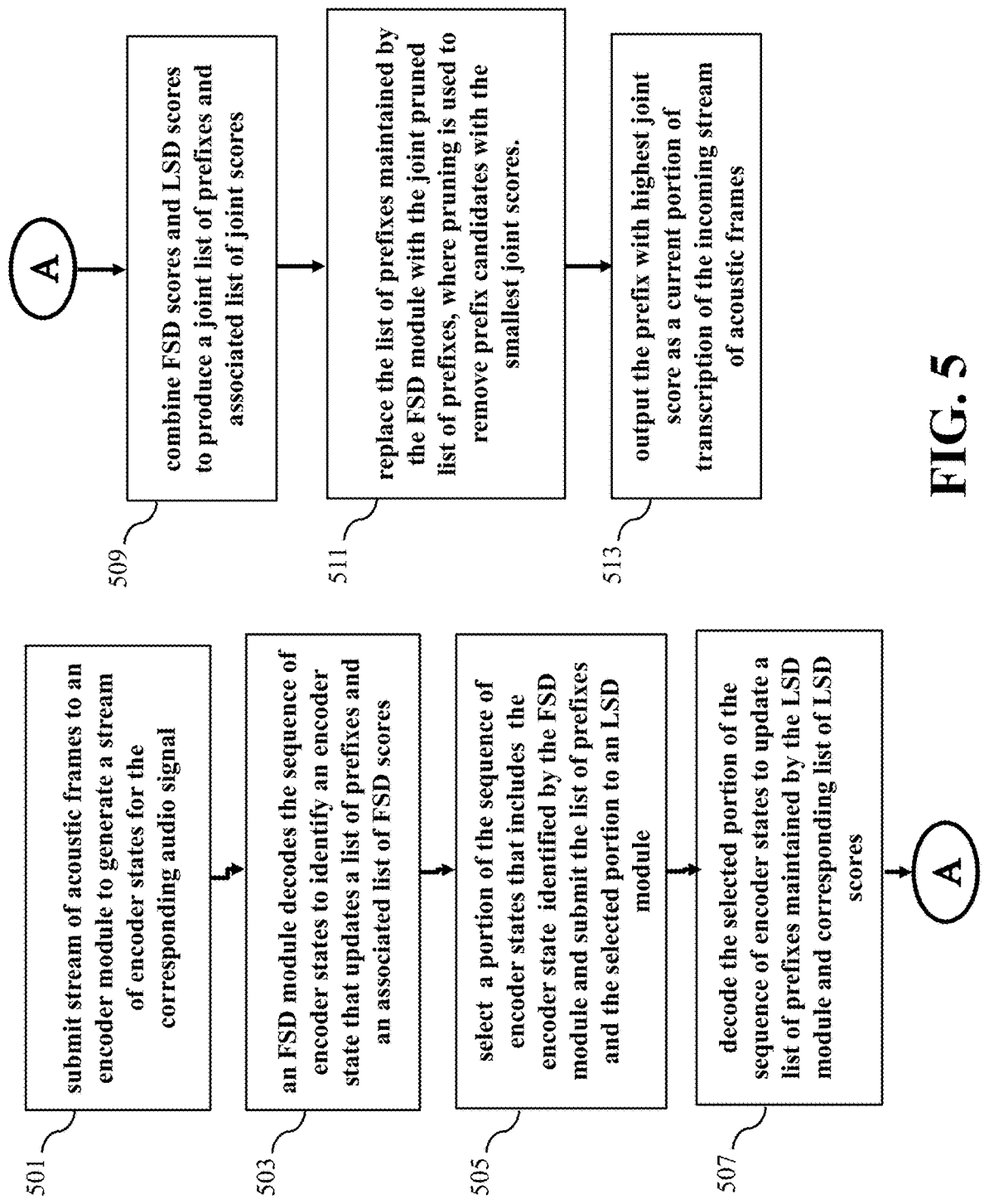
FIG. 5 illustrates the data flow diagram of the proposed ASR system in accordance with some embodiments.

FIG. 5 illustrates the data flow diagram of the ASR system 100 in accordance with some embodiments. At block 501, the ASR system receives a portion of speech utterance. The processor is further configured to convert the portion of speech utterance into a stream of frames that represents acoustic features of the speech utterance and submit the stream of acoustic feature frames to an encoder module. The encoder module generates a sequence of encoder states of encoded acoustic feature frames. At block 503, a frame-synchronous decoder (FSD) module processes or decodes the sequence of encoder states to identify an encoder state that expands a list of prefixes with an associated list of FSD scores, maintained by the FSD module. Each prefix of the list of prefixes is a candidate estimation of decoded transcription output. Further, each FSD score of the list of FSD scores corresponds to a probability of transcription output of corresponding prefix. In some embodiments, each FSD score of the list of FSD scores corresponds to a sum of all transcription output probabilities that lead to the same prefix. Thus, the FSD module provides information about locations of encoder states in the sequence of encoder states that encodes transcription outputs, such as characters, bits, words, etc.

At block 505, the location information of the encoder states identified by the FSD module is used by a synchronization module to select a portion of the sequence of encoder states that includes the encoder states identified by the FSD module. The synchronization module further submits a list of current prefixes generated by the FSD module and the selected portion of the sequence of encoder states to a label-synchronous decoder (LSD) module. This ensures that the LSD module processes on the same list of prefixes as that of the FSD module in order to estimate likelihood of transcription output. Thus, synchronization of the FSD module and the LSD module in prefix domain is achieved.

Further, to ensure that the LSD outputs a list of LSD scores for the list of prefixes in approximately the same time as that of the FSD module, at block 507, only the selected portion of the sequence of encoder states is decoded by the LSD module. This enables the LSD module to place attention only on the selected portion of the speech utterance and not on the entire speech utterance, which reduces output delay of the LSD module. Thus, synchronization of the FSD module and the LSD module in time domain is achieved.

Further, at block 509, a joint scoring module receives the list of prefixes and associated FSD scores and LSD scores from both the FSD module and the LSD module. The joint scoring module combines the FSD scores and the LSD scores of corresponding prefixes in the list of prefixes maintained by the FSD module and the list of prefixes maintained by the LSD module to produce a joint list of prefixes and associated list of joint scores. In addition, prefix probability estimates generated by an external language model 122 can be weighted and added to the corresponding joint scores to further improve the prefix candidate estimates. At block 511, the joint scoring module replaces the list of prefixes maintained by the FSD module with the joint list of prefixes, which is pruned to remove unlikely prefix candidates and to speed up the decoding process. This further synchronizes the list of likely prefix candidates of the FSD module and the LSD module for subsequent decoding of encoder states over subsequent time steps. Further, at block 513, the joint scoring module outputs the prefixes with highest joint scores as a current portion of transcription of the incoming stream of acoustic frames.

Figure 6:
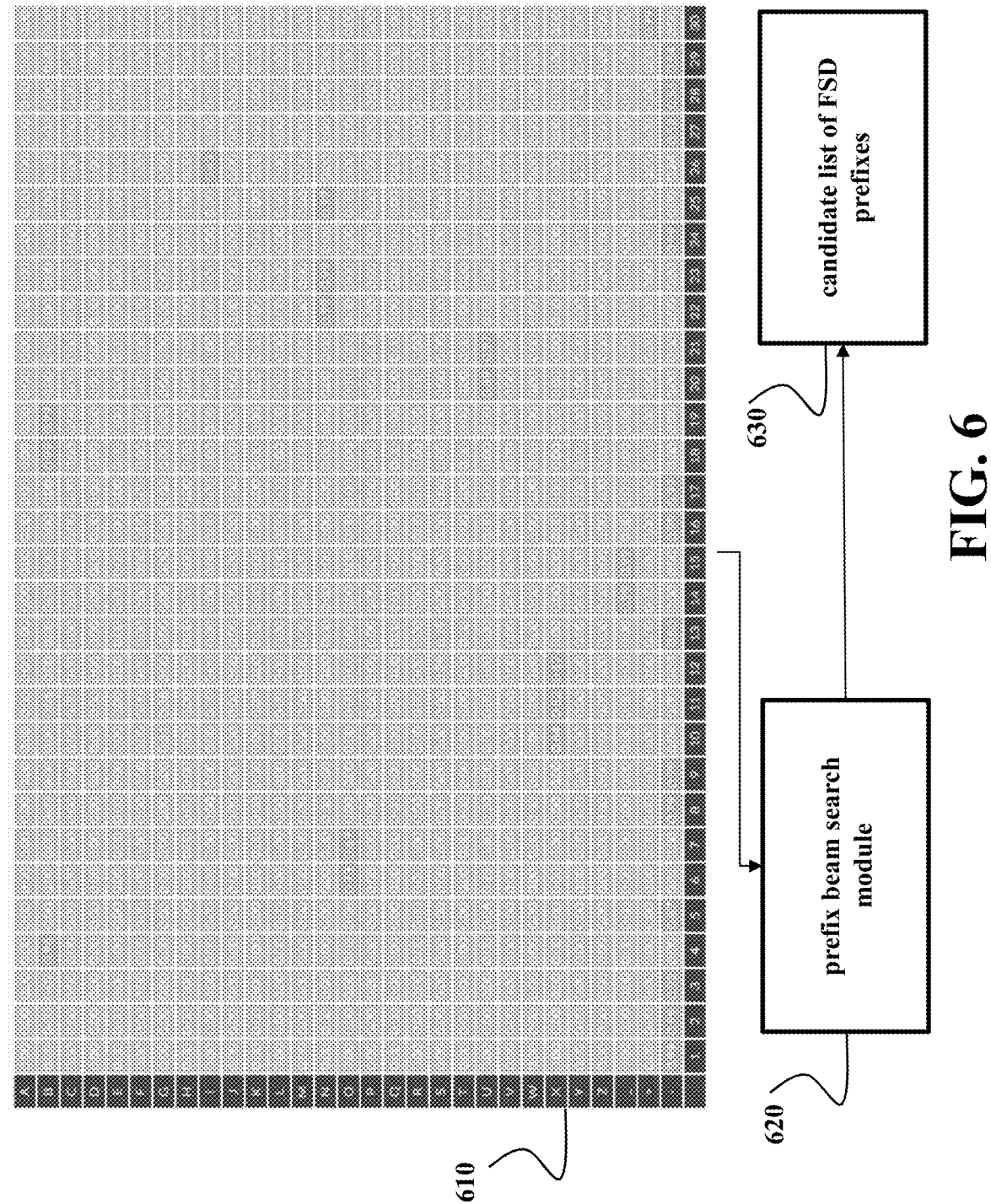
FIG. 6 shows a schematic of implementation of FSD module using a prefix beam search module according to some embodiments.

FIG. 6 shows a schematic of implementation of FSD module using a prefix beam search module according to some embodiments. In this example, the FSD module includes CTC neural network 213 outputting transcription output probabilities 610 for each encoder state. The prefix beam search module 620 is configured to search through outputs 610 of the CTC neural network to produce the candidate list of FSD prefixes 630 with FSD scores above a threshold. In this implementation, each FSD score is a sum over all probabilities of all transcription output sequences that lead to the same prefix after collapsing repeated labels and removing blank symbols.

In this example, a CTC network can predict a transcript directly from an audio input and/or from encoder states. The CTC network can produce a CTC matrix 610, where columns correspond to timesteps and each row corresponds to a letter in our alphabet. Since each column sums to one and all entries in CTC matrix are greater than zero, the CTC matrix is a distribution over our alphabet for each timestep, essentially, a letter prediction. In this example, the alphabet contains at least the letters A-Z, a space (_), and a blank token (-), where the latter is required by CTC networks. Some implementations round small probabilities to zero for readability.

The easiest way to decode this is to simply take the letter with the highest probability at each timestep—a method called max decoding or greedy decoding. However, taking the letter with the highest probability at each timestep is a simplification, because it is possible to trace multiple paths through CTC matrix all yielding the same label, given the contraction rules.

To that end, some embodiments use the prefix beam search module 620 to consider not only the highest probability, but a sum over all probabilities of all transcription output sequences that lead to the same prefix after collapsing repeated labels and removing blank symbols. In such a manner, the prefix beam search module computes the FSD scores of the candidate list of FSD prefixes based on the FSD scores of the current list of FSD prefixes pruned according to the joint scores. In some implementations, prefix beam search module 620 also uses scores generated by one or multiple external language models 122.

Figure 7:
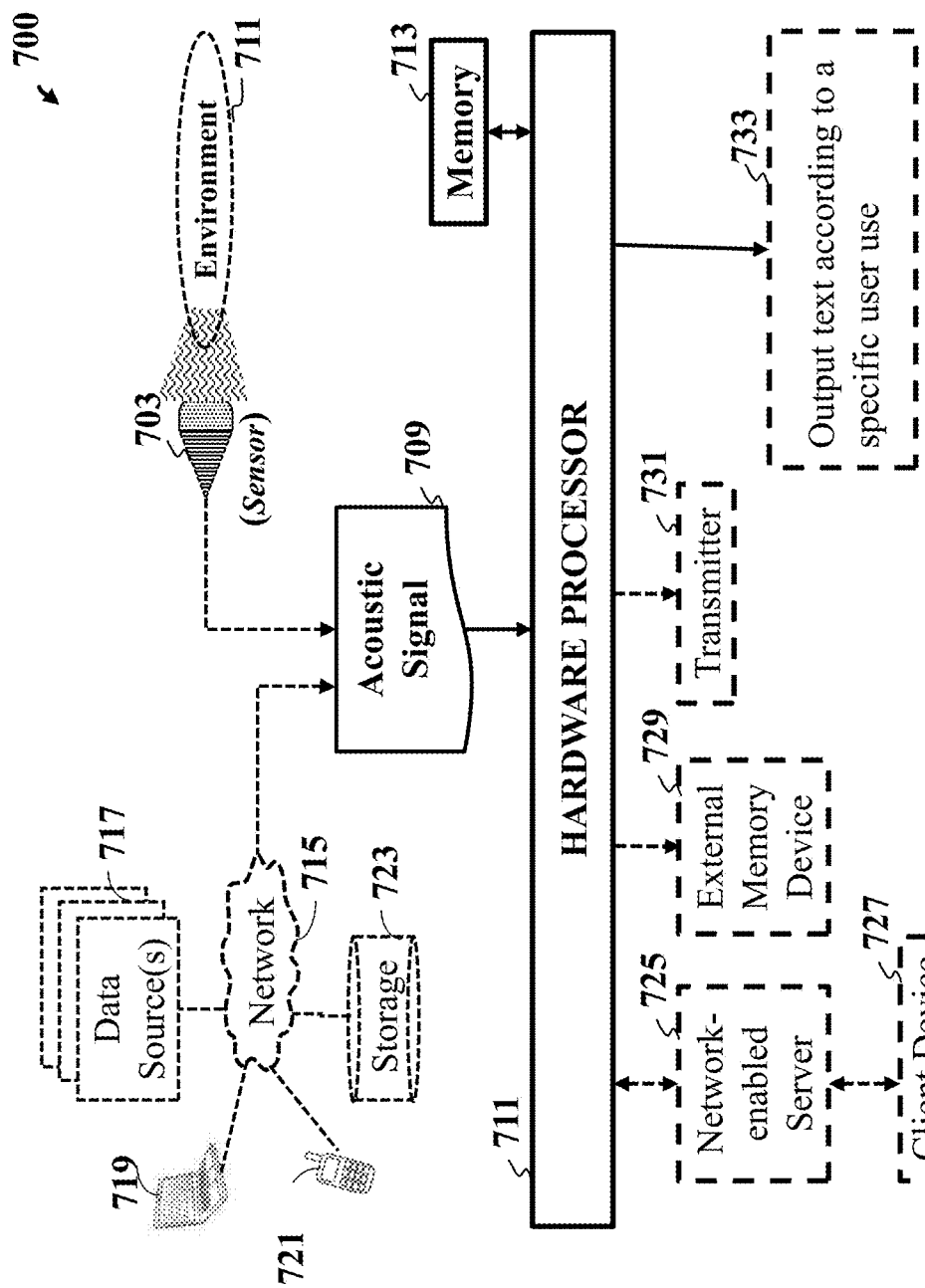
FIG. 7 illustrates a block diagram of some components that can be used in various configurations for implementing the ASR system, according to some embodiments.

FIG. 7 illustrates a block diagram of some components that can be used in various configurations for implementing the system, according to some embodiments. For example, the components 700 can include the hardware processor 701 in communication with a sensor 703 or sensors, such as an acoustic sensor, that collects data including an acoustic signal(s) 709 from an environment 711. Further, the sensor 703 can convert an acoustic input into the acoustic signal 709. The hardware processor 701 is in communication with a computer storage memory, i.e. memory 713, such that the memory 713 includes stored data, including algorithms, instructions and other data, that can be implemented by the hardware processor 701.

Optionally, the hardware processor 701 can be connected to a network 715, which is in communication with a data source(s) 717, computer device 719, a mobile phone device 721 and a storage device 723. Also optionally, the hardware processor 701 can be connected to a network-enabled server 725 connected to a client device 727. The hardware processor 701 can optionally be connected to an external memory device 729, and/or a transmitter 731. Further, the text of a speaker can be outputted according to a specific user intended use 733, for example, some types of user use can include displaying the text on one or more display device, such as a monitor or screen, or inputting the text of a speaker into a computer related device for further analysis, etc.

It is contemplated the hardware processor 701 can include one or more hardware processors depending upon the requirements of the specific application, wherein the processors can be either internal or external. Certainly, other components may be incorporated with components 700 including output interfaces and transceivers, among other devices.

It is possible the network 735 can include, by non-limiting example, one or more local area networks (LANs) and/or wide area networks (WANs), where the networking environments can be similar to enterprise-wide computer networks, intranets and the internet. Contemplated for all the components mentioned that there can be any number of client devices, storage components, and data sources employed with the components 700. Each may comprise a single device or multiple devices cooperating in a distributed environment. Further, the components 700 can include one or more data source(s) 717. Data source(s) 717 comprises data resources for training a speech recognition network. The data provided by data source(s) 717 may include labelled and un-labelled data, such as transcribed and un-transcribed data. For example, in an embodiment, the data includes one or more sounds and may also include corresponding transcription information or labels that may be used for initializing a speech recognition network.

Further, un-labelled data in data source(s) 717 can be provided by one or more feedback loops. For example, usage data from spoken search queries performed on search engines can be provided as un-transcribed data. Other examples of data sources may include by way of example, and not limitation, various spoken-language audio or image sources including streaming sounds or video, web queries, mobile device camera or audio information, web cam feeds, smart-glasses and smart-watch feeds, customer care systems, security camera feeds, web documents, catalogues, user feeds, SMS logs, instant messaging logs, spoken-word transcripts, gaming system user interactions such as voice commands or captured images (e.g., depth camera images), tweets, chat or video-call records, or social-networking media. Specific data source(s) 717 used may be determined based on the application including whether the data is a certain class of data (e.g., data only related to specific types of sounds, including machine systems, entertainment systems, for example) or general (non-class-specific) in nature.

The components 700 can include or be connected to third party devices which can comprise of any type of computing device, such that there may be interest to have automatic speech recognition (ASR) system on the computing device. For example, the third party devices may include a computer device 719 or a mobile device 721. Contemplated is that a user device may be embodied as a personal data assistant (PDA), a mobile device, such as a smartphone, smart watch, smart glasses (or other wearable smart device), augmented reality headset, virtual reality headset. Further, the user device could be a laptop, such as a tablet, remote control, entertainment system, vehicle computer system, embedded system controller, appliance, home computer system, security system, consumer electronic device, or other similar electronics device. In one embodiment, the client device 727 is capable of receiving input data such as audio and image information usable by an ASR system described herein that is operating on the device. For example, the third party device may have a microphone or line-in for receiving audio information, a camera for receiving video or image information, or a communication component (e.g., Wi-Fi functionality) for receiving such information from another source, such as the Internet or a data source 717.

The ASR model using a speech recognition network can process the inputted data to determine computer-usable information. For example, a query spoken by a user into a microphone may be processed to determine the content of the query, for example, if a question is asked. Example third party devices 719, 721 are optionally included in the components 700 to illustrate an environment that the deep neural network model may be deployed. Further, some embodiments of the present disclosure may not include third party devices 737, 739. For example, a deep neural network model can be on a server or in a cloud network, system or like arrangement.

Regarding the storage 723, the storage 723 can store information including data, computer instructions (e.g., software program instructions, routines, or services), and/or models used in embodiments of the technology described herein. For example, the storage 723 can store data from one or more data source(s) 717, one or more deep neural network models, information for generating and training deep neural network models, and the computer-usable information outputted by one or more deep neural network models.

Embodiments

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A computer-based automatic speech recognition system, wherein the system uses a processor coupled with stored instructions implementing modules of the system, wherein the processor executing the instructions is configured to
  encode an incoming stream of acoustic frames representing features of a speech utterance into a sequence of encoder states of encoded acoustic feature frames; and
  successively process each encoder state of encoded acoustic feature frames with a frame-synchronous decoder (FSD) module until a termination condition is met, wherein the FSD module, in response to identifying an encoder state carrying information about a new transcription output, expands a current list of FSD prefixes to produce a candidate list of FSD prefixes and corresponding FSD scores, wherein each FSD prefix in the candidate list is an estimation by the FSD module of decoded transcription outputs in the encoder states processed by the FSD module, wherein a probability of an FSD prefix being the decoded transcription outputs is defined by the corresponding FSD score, wherein, in response to producing the candidate list of FSD prefixes, the processor is configured to
  select a portion of the encoder states including the encoder state identified by the FSD module and trigger a label-synchronous decoder (LSD) module to process the selected portion of encoder states to determine LSD scores defining probabilities of the FSD prefixes in the candidate list of FSD prefixes being the decoded transcription outputs in the selected portion of encoder states according to the LSD module;
  prune the candidate list of FSD prefixes according to joint scores defined by a combination of corresponding FSD scores and LSD scores; and
  replace the current list of FSD prefixes with the pruned list of FSD prefixes to continue decoding for a next transcription output.

2. The system of claim 1, wherein the size of the current list of FSD prefixes is fixed and is less than the size of the candidate list of FSD prefixes, such that the pruning preserves n-best FSD prefixes in the candidate list of FSD prefixes with highest joint scores, wherein n is the size of the current list of FSD prefixes.

3. The system of claim 1, wherein the processor replaces only FSD prefixes without replacing FSD scores in the replaced current list of FSD prefixes.

4. The system of claim 1, wherein the processor is configured to output the FSD prefix with the highest joint score as the decoded transcription outputs for a portion of the incoming stream of acoustic frames corresponding to the portion of the sequence of encoder states.

5. The system of claim 1, wherein the FSD module includes
a connectionist temporal classification (CTC) neural network outputting transcription output probabilities for each encoder state; and
a prefix beam search module configured to search through outputs of the CTC neural network to produce the candidate list of FSD prefixes with FSD scores above a threshold, wherein each FSD score is a sum over all probabilities of all transcription output sequences that lead to the same prefix after collapsing repeated labels and removing blank symbols, wherein the prefix beam search module computes the FSD scores of the candidate list of FSD prefixes based on the FSD scores of the current list of FSD prefixes pruned according to the joint scores.

6. The system of claim 1, wherein the FSD module includes a neural network having a recurrent neural network-transducer (RNN-T) architecture.

7. The system of claim 1, wherein the LSD module includes an attention-based decoder neural network.

8. The system of claim 7, wherein the LSD module determines a list of LSD prefixes and corresponding LSD scores for each partition of encoder states submitted as an input, and outputs LSD scores only for the LSD prefixes matching the FSD prefixes.

9. The system of claim 1, wherein the modules of the system include a synchronization module configured to synchronize the FSD module and the LSD module in time and prefix domains by triggering the LSD module to process the portion of the encoder states including the new transcription output identified by the FSD module and by allowing the LSD module to estimate the LSD scores for the FSD prefixes produced by the FSD module.

10. The system of claim 9, wherein the synchronization module selects the portion of the sequence of encoder states from the beginning of the sequence until a look-ahead encoder state, wherein the look-ahead encoder state is determined by shifting the location of the encoder state identified by the FSD module forward with a fixed shift.

11. The system of claim 9, wherein the synchronization module selects the portion of the sequence of encoder states that includes a predetermined number of look-ahead and look-back encoder states relative to the location of the encoder state identified by the FSD module.

12. The system of claim 1, wherein the modules of the system include an encoder neural network jointly trained with the FSD module and the LSD module to form a triggered attention (TA) neural network.

13. The system of claim 12, wherein the encoder includes a unidirectional encoder neural network based on parallel time-delayed long short-term memory (PTDLSTM) streams.

14. The system of claim 12, wherein the encoder and the LSD module are implemented using a transformer architecture.

15. A non-transitory computer readable storage medium embodied thereon a program including modules executable by a processor for performing automatic speech recognition, the modules comprising:
an encoder configured to encode an incoming stream of acoustic frames representing features of a speech utterance into a sequence of encoder states of encoded acoustic feature frames;
a frame-synchronous decoder (FSD) module configured to successively process each encoder state of encoded acoustic feature frames to expand, in response to identifying an encoder state carrying information about a new transcription output, a current list of FSD prefixes to produce a candidate list of FSD prefixes and corresponding FSD scores, each FSD prefix in the candidate list is an estimation by the FSD module of decoded transcription outputs in the encoder states processed by the FSD module, wherein a probability of an FSD prefix being the decoded transcription outputs is defined by the corresponding FSD score;
a synchronization module configured to select a portion of the encoder states including the encoder state identified by the FSD module;
a label-synchronous decoder (LSD) module configured to process the selected portion of encoder states to join the FSD scores of the FSD prefixes with corresponding LSD scores defining a probability of the FSD prefix being the decoded transcription output according to the LSD module;
a joint scoring module configured to prune the FSD prefixes according to the joint FSD and LSD scores and replace the current list of FSD prefixes with the pruned list of FSD prefixes to continue decoding for a next transcription output; and
an output interface configured to output the FSD prefix with the highest joint score as the decoded transcription outputs of the incoming stream of acoustic frames for the encoder states processed by the FSD module.

16. The medium of claim 15, wherein the synchronization module configured to synchronize the FSD module and the LSD module in time and prefix domains by triggering the LSD module to process the portion of the encoder states including the new transcription output identified by the FSD module and by passing the FSD prefixes to the LSD module to enable the LSD module to estimate the LSD scores for the FSD prefixes.

17. The medium of claim 15, wherein the FSD module includes
a connectionist temporal classification (CTC) neural network outputting transcription output probabilities for each encoder state; and
a prefix beam search module configured to search through outputs of the CTC neural network to produce the candidate list of FSD prefixes with FSD scores above a threshold, wherein each FSD score is a sum over all probabilities of all transcription output sequences that lead to the same prefix after collapsing repeated labels and removing blank symbols, wherein the prefix beam search module computes the FSD scores of the candidate list of FSD prefixes based on the FSD scores of the current list of FSD prefixes pruned according to the joint scores; and
wherein the LSD module includes an attention-based decoder neural network.

18. The medium of claim 15, wherein the modules further comprising:
an external language model configured to score the candidate list of FSD prefixes, wherein the joint scoring module updates the joint FSD and LSD scores with the scores determined by the external language model and prunes the candidate list of FSD prefixes based on the updated joint FSD and LSD scores.

19. A method for automatic speech recognition, wherein the method uses a processor coupled with stored instructions implementing the method, wherein the instructions, when executed by the processor carry out steps of the method, comprising:

encoding an incoming stream of acoustic frames representing features of a speech utterance into a sequence of encoder states of encoded acoustic feature frames;

successively processing each encoder state of encoded acoustic feature frames with a frame-synchronous decoder (FSD) module until a termination condition is met, wherein the FSD module, in response to identifying an encoder state carrying information about a new transcription output, expands a current list of FSD prefixes to produce a candidate list of FSD prefixes and corresponding FSD scores, wherein each FSD prefix in the candidate list is an estimation by the FSD module of decoded transcription outputs in the encoder states processed by the FSD module, wherein a probability of an FSD prefix being the decoded transcription outputs is defined by the corresponding FSD score;

selecting a portion of the encoder states including the encoder state identified by the FSD module;

triggering a label-synchronous decoder (LSD) module to process the selected portion of encoder states to determine LSD scores defining probabilities of the FSD prefixes in the candidate list of FSD prefixes being the decoded transcription outputs in the selected portion of encoder states according to the LSD module;

pruning the candidate list of FSD prefixes according to joint scores defined by a combination of corresponding FSD scores and LSD scores; and replacing the current list of FSD prefixes with the pruned list of FSD prefixes to continue decoding for a next transcription output.

20. The method of claim 19, further comprising:

outputting the FSD prefix with the highest joint score as the decoded transcription outputs for a portion of the incoming stream of acoustic frames corresponding to the portion of the sequence of encoder states.

\* \* \* \* \*